US 8,605,008 B1

(12) United States Patent
Prest et al.

(10) Patent No.: US 8,605,008 B1
(45) Date of Patent: Dec. 10, 2013

(54) HEAD-MOUNTED DISPLAY

(75) Inventors: Christopher D. Prest, Mountain View, CA (US); John Tang, San Carlos, CA (US); M. Evans Hankey, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 723 days.

(21) Appl. No.: 12/114,499

(22) Filed: May 2, 2008

Related U.S. Application Data

(60) Provisional application No. 60/927,624, filed on May 4, 2007.

(51) Int. Cl.
*G09G 5/00* (2006.01)

(52) U.S. Cl.
USPC ................................................. 345/8; 345/7

(58) Field of Classification Search
USPC ............................................................. 345/7, 8
See application file for complete search history.

(56) References Cited

U.S. PATENT DOCUMENTS

| | | | |
|---|---|---|---|
| 5,003,300 A | | 3/1991 | Wells |
| 5,632,742 A * | | 5/1997 | Frey et al. .................... 606/12 |
| 5,673,059 A * | | 9/1997 | Zavracky et al. ............... 345/8 |
| 6,046,712 A * | | 4/2000 | Beller et al. .................... 345/8 |
| 6,101,038 A * | | 8/2000 | Hebert et al. .................. 345/30 |
| 6,320,559 B1 * | | 11/2001 | Yasukawa et al. ............... 345/7 |
| 6,323,846 B1 | | 11/2001 | Westerman et al. |
| 6,450,639 B1 * | | 9/2002 | Abraham ..................... 351/62 |
| 6,480,174 B1 * | | 11/2002 | Kaufmann et al. ............... 345/8 |
| 6,611,653 B1 | | 8/2003 | Kim et al. .................... 386/343 |
| 6,916,096 B2 | | 7/2005 | Eberl et al. |
| 7,245,273 B2 | | 7/2007 | Eberl et al. |
| 7,530,019 B2 | | 5/2009 | Kjeldsen et al. .............. 715/730 |
| 7,595,933 B2 | | 9/2009 | Tang |
| 7,641,342 B2 | | 1/2010 | Eberl et al. |
| 7,969,383 B2 | | 6/2011 | Eberl et al. |

(Continued)

FOREIGN PATENT DOCUMENTS

| | | |
|---|---|---|
| DE | 10047237 A1 | 4/2002 |
| DE | 10047237 A1 | 7/2002 |

(Continued)

OTHER PUBLICATIONS

"U.S. Appl. No. 12/072,762, Examiner Interview Summary mailed Jan. 11, 2011", 3 pgs.
"U.S. Appl. No. 12/072,762, Examiner Interview Summary mailed Jun. 11, 2011", 3 pgs.
"U.S. Appl. No. 12/072,762, Examiner Interview Summary mailed Nov. 3, 2011", 3 pgs.

(Continued)

*Primary Examiner* — Abbas Abdulselam
*Assistant Examiner* — Shawna Stepp Jones
(74) *Attorney, Agent, or Firm* — Schwegman Lundberg & Woessner, P.A.

(57) ABSTRACT

A goggle system for providing a personal media viewing experience to a user is provided. The goggle system may include an outer cover, a mid-frame, optical components for generating the media display, and a lens on which the generated media displayed is provided to the user. The goggle system, or head mounted display may have any suitable appearance. For example, the goggle system may resemble ski or motorcycle goggles. To enhance the user's comfort, the goggle system may include breathable components, including for example breathable foam that rests against the user's face, and may allow the user to move the display generation components for alignment with the user's eyes. In some embodiments, the goggle system may include data processing circuitry operative to adjust left and right images generated by the optical components to display 3-D media, or account for a user's eyesight limitations.

9 Claims, 25 Drawing Sheets

(56) References Cited

U.S. PATENT DOCUMENTS

| | | | |
|---|---|---|---|
| 8,016,421 | B2 | 9/2011 | Eberl et al. |
| 8,042,947 | B1 | 10/2011 | Eberl et al. |
| 8,113,657 | B2 | 2/2012 | Eberl et al. |
| 2002/0082879 | A1 | 6/2002 | Miller et al. |
| 2002/0101568 | A1 | 8/2002 | Eberl et al. |
| 2002/0109680 | A1 | 8/2002 | Orbanes et al. |
| 2002/0113755 | A1* | 8/2002 | Lee .................................. 345/7 |
| 2004/0224638 | A1 | 11/2004 | Fadell et al. |
| 2005/0278750 | A1 | 12/2005 | Grossman et al. |
| 2006/0061555 | A1 | 3/2006 | Mullen |
| 2006/0119576 | A1 | 6/2006 | Richardson |
| 2007/0162853 | A1 | 7/2007 | Weber et al. .................. 715/719 |
| 2007/0201737 | A1 | 8/2007 | Cai |
| 2007/0237491 | A1* | 10/2007 | Kraft .............................. 386/46 |
| 2008/0088529 | A1 | 4/2008 | Tang |
| 2008/0088936 | A1 | 4/2008 | Tang et al. |
| 2008/0088937 | A1 | 4/2008 | Tang |
| 2008/0246694 | A1 | 10/2008 | Fischer |
| 2008/0249895 | A1 | 10/2008 | Mariotti |
| 2008/0255889 | A1 | 10/2008 | Geisler et al. |
| 2010/0331721 | A1 | 12/2010 | Epley |
| 2011/0090135 | A1 | 4/2011 | Tricoukes et al. |

FOREIGN PATENT DOCUMENTS

| | | | |
|---|---|---|---|
| DE | 10103922 | A1 | 7/2002 |
| DE | 10103922 | A1 | 8/2002 |
| WO | 0231577 | A1 | 4/2002 |
| WO | 0231578 | A1 | 4/2002 |
| WO | 0231580 | A1 | 4/2002 |
| WO | 0233472 | A2 | 4/2002 |
| WO | WO-0231577 | A1 | 4/2002 |
| WO | WO-0231578 | A1 | 4/2002 |
| WO | WO-0231580 | A1 | 4/2002 |
| WO | WO-0233472 | A2 | 4/2002 |

OTHER PUBLICATIONS

"U.S. Appl. No. 12/072,762, Final Office Action mailed Feb. 24, 2012", 36 pgs.

"U.S. Appl. No. 12/072,762, Final Office Action mailed Apr. 29, 2011", 29 pgs.

"U.S. Appl. No. 12/072,762, Non Final Office Action mailed Aug. 29, 2011", 31 pgs.

"U.S. Appl. No. 12/072,762, Non Final Office Action mailed Nov. 26, 2010", 24 pgs.

"U.S. Appl. No. 12/072,762, Response filed Feb. 25, 2011 to Non Final Office Action mailed Nov. 26, 2010", 18 pgs.

"U.S. Appl. No. 12/072,762, Response filed May 24, 2012 to Final Office Action mailed Feb. 24, 2012", 25 pgs.

"U.S. Appl. No. 12/072,762, Response filed Jul. 28, 2011 to Final Office Action mailed Apr. 29, 2011", 19 pgs.

"U.S. Appl. No. 12/072,762, Response filed Nov. 29, 2011 to Non Final Office Action mailed Aug. 29, 2011", 23 pgs.

"U.S. Appl. No. 12/072,763, Final Office Action mailed Nov. 15, 2011", 9 pgs.

"U.S. Appl. No. 12/072,763, Non Final Office Action mailed May 12, 2011", 8 pgs.

"U.S. Appl. No. 12/072,763, Response filed Feb. 15, 2012 to Final Office Action mailed Nov. 15, 2011", 13 pgs.

"U.S. Appl. No. 12/072,763, Response filed Feb. 22, 2011 to Restriction Requirement mailed Jan. 20, 2011", 3 pgs.

"U.S. Appl. No. 12/072,763, Response filed Aug. 12, 2011 to Non Final Office Action mailed May 12, 2011", 15 pgs.

"U.S. Appl. No. 12/072,763, Restriction Requirement mailed Jan. 20, 2011", 6 pgs.

U.S. Appl. No. 12/072,762, filed Feb. 27, 2008, Adjusting Media Display in a Personal Display System Based on Perspective.

U.S. Appl. No. 12/072,763, filed Feb. 27, 2008, Automatically Adjusting Media Display in a Personal Display System.

* cited by examiner

HEAD-MOUNTED DISPLAY

CROSS-REFERENCE TO RELATED APPLICATIONS

This application claims the benefit of prior filed U.S. Provisional Patent Application No. 60/927,624, filed May 4, 2007, which is incorporated by reference herein in its entirety.

BACKGROUND OF THE INVENTION

This invention is directed to a display for video that is mounted to a user's head.

Users of electronic devices may view media on different types of screens. For example, users may view media on a screen integrated in the electronic device (e.g., view media on the display screen of a personal electronic device, for example the iPod™ available by Apple Inc. of Cupertino, Calif.). As another example, users may couple the electronic device to a separate display and direct the display to provide the media. For example, users may couple a computer to a screen and display media on the computer screen. As another example, users may direct a television to display media streamed or downloaded from an electronic device (e.g., using an Apple TV™ available by Apple Inc. of Cupertino, Calif. to display content from a user's computer on a television).

For users who wish to view media provided by an electronic device when they are away from their homes and away from their television and computer screens (e.g., users traveling), integrated displays may be limiting. Such users may instead desire a personal display system with which the user may appear to view media on a large display (e.g., on a home television) while in fact using a portable display system. Such users may also desire a personal display that is visible only to the user (e.g., for viewing private or sensitive content).

Accordingly, there is a need for a personal display system with which users can privately view media provided by an electronic device. In particular, there is a need for a head-mounted display for allowing users to view media.

SUMMARY OF THE INVENTION

A system for providing a personal display for viewing media provided by an electronic device is provided.

A personal goggle system for presenting a personal display of media is provided. The goggle system may include an outer cover, a frame and a display generation component. To enhance the appearance and aesthetic appeal of the goggle system, the outer cover and frame may be designed to resemble ski or motorcycle goggles (e.g., covering only the user's eyes, with a foam layer against the user's face).

In some embodiments, the outer layer may include one or more surfaces covering the frame. The surfaces may be curved or flat, and may include one or more features for customizing or enhancing the appearance of the outer cover. For example, the outer layer may include a curved surface on which a graphic or design may be painted, fixed (e.g., a sticker), carved, sculpted, molded, or embedded using any other suitable process. To further customize or personalize the goggle system, the outer cover may be removable and replaceable (e.g., for a user to change the appearance of the goggle system at different times).

The goggle frame may be constructed from one or several components. For example, the goggle frame may include at least one of a mid-frame or spacer, an inner cover, and a mounting frame. The frame may include one or more features operative to receive the outer cover (e.g., a surface against which the outer cover is glued, or a catch mechanism for engaging the outer cover). The mid-frame may form the structural component to which the remaining components of the goggle system are coupled. For example, the inner cover, which may support the mounting frame (which in turn may support the display generation component) may be coupled to the mid-frame. The mid-frame and outer cover may be constructed from any suitable material, including for example from a flexible material operative to bend or flex to match the shape of a user's face.

The goggle system may include any suitable display generation component. For example, the goggle system may include two display generation components operative to provide the displayed images for each eye. In some embodiments, the display generation components may be moved relative the goggle frame to be placed opposite the user's eyes (e.g., move or tilt the display generation components to align them with the user's eyes). The display generation components may be operative to provide different images for each eye. For example, the components may offset the images to give the user the illusion of viewing media in three dimensions. As another example, the components may provide different images for each eye based on the eyesight corrections needed by the user (e.g., change the focus to reflect an eyesight prescription). In some embodiments, the display generation components may provide the displayed images on a lens coupled to the frame (e.g., attached to the inner cover).

The goggle system may include a foam layer adjacent the frame that rests against the user's face. The foam may serve to prevent ambient light from entering the goggle system and affecting the images displayed on the lens. The foam layer may be formed from any suitable compressible material, including for example different types of foam or flock. In some embodiments, the foam may be more compressible in regions where a user's eyeglasses contact the frame to enhance the comfort of the goggle system.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
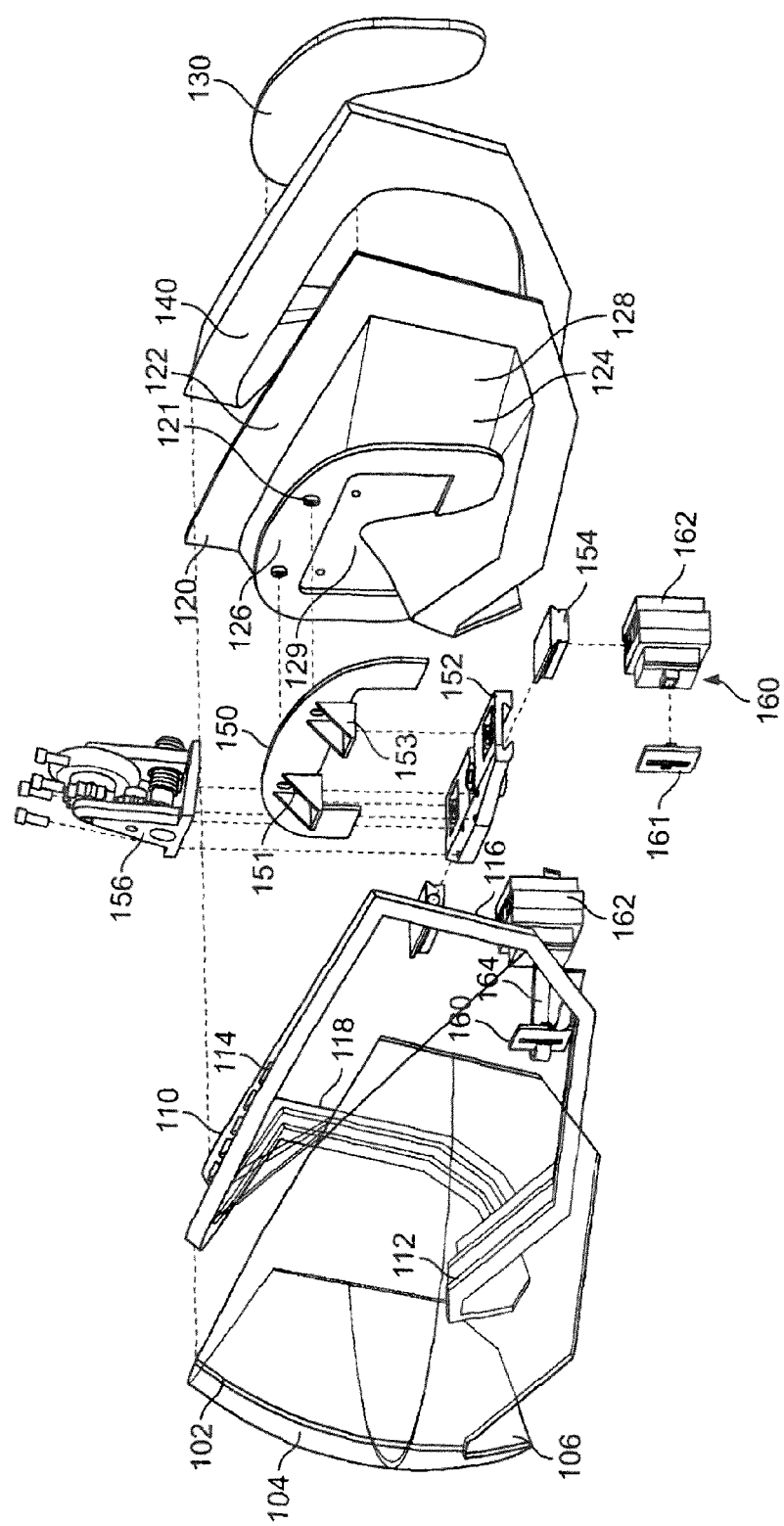
FIG. 1 is an exploded view of a goggle system for providing a personal display of media in accordance with one embodiment of the present invention.

FIG. 1 is an exploded view of a goggle system for providing a personal display of media in accordance with one embodiment of the present invention. Goggle system 100 may include outer cover 102, mid-frame 110, inner cover 120, inner lens 130, foam 140, and mounting frame 150.

Outer cover 102 may be coupled to mid-frame 110 to form the outer surface of goggle system 100. Outer cover 102 may be formed from any suitable material including, for example, glass, plastic, ceramic, metal (e.g., polished aluminum), or any other suitable material. In some embodiments, outer surface 104 of outer cover 102 may be treated to provide an aesthetically pleasing finish (e.g., a reflective finish, or added logos or designs) to enhance the appearance of the goggle system. In some embodiments, outer surface 104 may be personalized. For example, a user may paint outer surface 104, attach decals or stickers, or modify outer surface 104 in any other suitable manner to personalize outer surface 104.

Outer cover 102 may be constructed into any suitable shape. In the example shown in FIG. 1, outer cover 102 is a curved surface that generally follows the contours of a user's face. As another example, outer cover 102 may be a planar or substantially planar surface. In some embodiments, outer cover 102 may be constructed into a particular shape defined or selected by the user. For example, outer cover 102 may include a feature (e.g., a recessed or protruding design formed by machining) embedded on outer cover 102, or outer cover may extend beyond or not reach the edges of mid-frame 110 (e.g., outer cover 102 manufactured in the shape of a logo, or may include wings extending beyond the periphery of mid-frame 110). In some embodiments, outer cover 102 may be formed from several pieces that are combined (e.g., and held in place by mid-frame 110). To enhance customization of goggle system 100, outer cover 102 may be removable and replaceable with different outer covers (e.g., as skins for the goggle system).

In some embodiments, inner surface 106 of outer cover 102 may be darkened. For example, inner surface 106 may be black (e.g., painted black, or manufactured from black material). This may provide a better viewing contrast for a user of goggle system 100, as images provided by display generation components for display on lens 130 may contrast with outer cover 102. In addition, a darkened inner surface 106 may enhance a user's experience by giving the user the impression of being in a theater or other optimal environment for viewing media.

Mid-frame 110 may form the outer support structure for goggle system 100. Mid-frame 110 may be formed from any suitable material that has suitable properties for supporting some or all of the components of goggle system 100. For example, mid-frame 110 may be formed from a material capable of withstanding impacts or shocks to protect the components of goggle system 100. As another example, mid-frame 110 may be formed from a lightweight material that affords the user comfort. Suitable materials may include, for example, composite materials, plastics, metals, metal alloys (e.g., steel, stainless steel, aluminum, titanium, or magnesium-based alloys), or any other suitable material. Portions of mid-frame 110 that are visible during use may be treated or finished to provide an aesthetically pleasing appearance.

In some embodiments, mid-frame 110 may include groove 112 for receiving outer cover 102 (e.g., formed on the outer portion of mid-frame 110) or any other suitable attachment feature. Any suitable approach may be used to couple outer cover 102 to groove 112, including for example press-fitting, an adhesive, a gasket, tape, a mechanical fastener, combinations of these, or any other suitable approach. In some embodiments, groove 112 and outer cover 102 may include interlocking elements (e.g., grooves and ridges, fingers and holes, or a snap fit) operative to engage and maintain outer cover 102 in mid-frame 110.

Mid-frame 110 may include any suitable features for optimizing a user's comfort and the performance of components of goggle system 100. For example, mid-frame 110 may include perforations 114 designed to allow humidity to escape from within goggle system 100, and to maintain a constant temperature inside and outside goggle system 100 (e.g., to prevent fogging or failure of electronic components of the goggle system). Perforations 114 may be circular, oval, rectangular, or any other suitable shape, and may be distributed using any suitable pattern or approach on mid-frame 110 (e.g., the size and location of perforations 114 may be selected to optimize user comfort and goggle system performance).

In some embodiments, mid-frame 110 may include slots 116 for receiving a strap for securing goggle system 100 to the user's face. The strap may include any suitable strap or apparatus for securing goggle system 100 to the user's face including, for example, an elastic strap, a fabric or cloth strap (e.g., with a buckle or tightening mechanism), several straps, or any other suitable mechanism for securing the goggle system. Slots for receiving the strap may be seen more clearly in FIG. 5, for example (see, e.g., slots 222). Slots 116 may be formed in any suitable shape and located on any suitable portion of mid-frame 110.

Mid-frame 110 may include channel 118 for receiving inner cover 120 or any other suitable attachment feature (e.g., formed on the inner portion of mid-frame 110). Any suitable approach may be used to couple inner cover 120 to channel 118, including for example press-fitting, an adhesive, a gasket, tape, a mechanical fastener, combinations of these, or any other suitable approach. In some embodiments, groove 112 and outer cover 102 may include interlocking elements (e.g., grooves and ridges, fingers and holes, or a snap fit) operative to engage and maintain outer cover 102 in mid-frame 110.

Inner cover 120 may form the support structure for the display generation components of goggle system 100. Combined with mid-frame 110, inner cover 120 and mid-frame 110 may provide structural integrity to goggle system 100. Inner cover 120 may be manufactured from any suitable material, including for example, plastic, composite materials, metal or metallic alloys (e.g., aluminum), combinations thereof, or any other suitable material. The material used for inner cover 120 may be selected for any particular quality or attribute. For example, the material used may be selected for its weight, strength or rigidity, flexibility or suppleness, combinations of these, or any other suitable attribute.

Inner cover 120 may include curved surface 122 along all or at least part of the outer edge of inner cover 120. Curved surface 122 may be operative to conform to the shape of a user's face, for example along a user's forehead, cheeks, and nose. In some embodiments, curved surface 122 may be configured to closely follow a user's face to reduce or eliminate ambient light entering between inner cover 120 and the user's face (and affecting the media displayed on lens 130).

Inner cover 120 may include protrusion 124 extending from curved surface 122 operative to support the display generation components of goggle system 100. Protrusion 124 may include mounting plate 126 and side walls 128. Mounting plate 126 may be operative to receive mounting frame 150, which may support some or all of the display generation components of goggle system 100. Side walls 128 may be constructed such that the distance between the user's eyes and mounting plate 126 is optimized for the user's viewing experience (e.g., side walls 128 have a length such that the distance between a user's eyes and the display generation components and the size or resolution of the displayed image is equivalent to watching media in a movie theater, for example 5 meters from a large screen).

Inner cover 120 may include aperture 129 aligned with the display generation components of goggle system 100. In some embodiments, inner cover 120 may include a single aperture 129 through which displays provided by several display generation components may be projected (e.g., the displays of two display generation components, one for each eye). In some embodiments, inner cover 120 may include several apertures, for example one for each eye or one for each of several display generation components. If the position of the display generation components is adjustable, aperture 129 may be enlarged to allow images generated by the display generation components to project through inner cover 120 for each display generation component position. In some embodiments, inner cover 120 may include a transparent or translucent pane within aperture 129 through which displays generated by the display generations components may pass. The panes may serve, for example, to protect the display generation circuitry from impacts, scratches, or other damage originating from the inner surface of inner cover 120.

Images provided by the display generation components of goggle system 100 may be displayed for the user on lens 130. Lens 130 may be positioned in inner cover 120 such that lens 130 covers or substantially covers aperture 129, and is opposite the display generation components of goggle system 100 (e.g., for images generated by the display generation components to appear on lens 130). Lens 130 may be coupled to the inner surface of inner cover 120 using any suitable approach. In some embodiments, lens 130 may be detachedly coupled to inner cover 120, for example using an adhesive, tape, hook and fastener material (e.g., Velcro™), a mechanical fastener (e.g., a screw or bolt), a rubber gasket, or any other suitable detachable mechanism. Such an approach may allow a user to remove lens 130 for cleaning, repairing or replacing components of goggle system 100 (e.g., the display generation components). In some embodiments, lens 130 may instead be permanently coupled to inner surface 120, for example using an adhesive, a fastener, an engagement system (e.g., a knob that mushrooms), or any other suitable mechanism or combination of mechanisms.

Lens 130 may be manufactured from any suitable material. In some embodiments, the material for lens 130 may be selected for optical properties to optimize the display of images or media generated by the display generation components of goggle system 100. Such materials may include, for example, glass, plastic, a composite material, paper, or any other suitable material. The material may be selected based on any other suitable attribute, including for example ease of cleaning, resistance to scratches or other damage affecting the optical properties of the lens, impact resistance or tight sealing to protect the display generation components from damage, or any other attribute or combination of attributes. In some embodiments, lens 130 may instead or in addition be embedded in one or more of the display generation components (e.g., near aperture 129).

Figure 2:
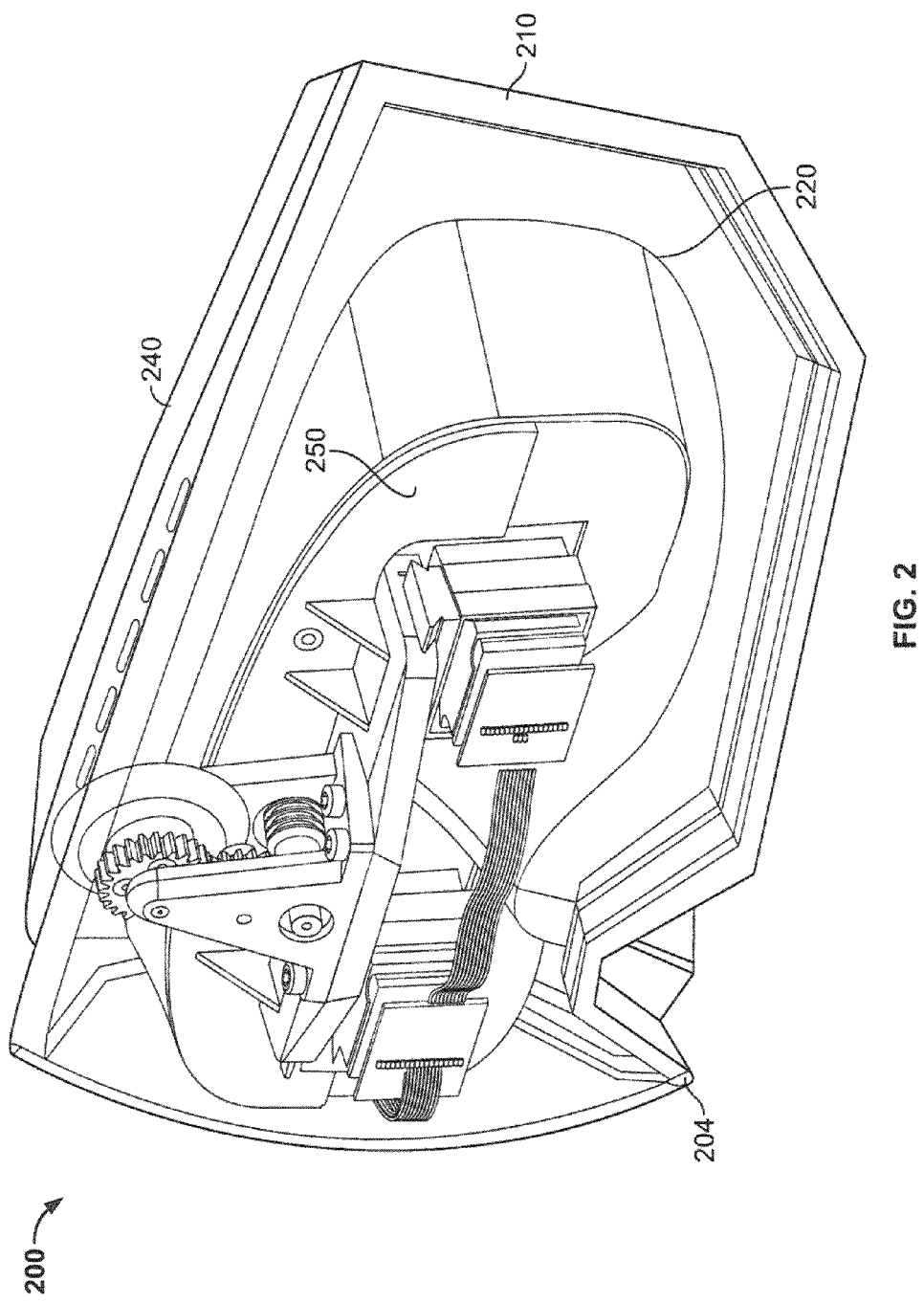
FIG. 2 is a perspective view of the goggle system of FIG. 1 when it is assembled in accordance with one embodiment of the invention.

FIG. 2 is a perspective view of the goggle system of FIG. 1 when it is assembled in accordance with one embodiment of the invention. Goggle system 200 may include outer cover 204, mid-frame 210, inner cover 220, mounting frame 250 and foam 240, which may include some or all of the features of related elements of goggle system 100 (FIG. 1). Outer cover 204 may be coupled to mid-frame 210 to form the exterior face of goggle system 200. Inner cover 220 may be coupled to mid-frame 220 to form the structural backbone of goggle system 200. Mounting frame 250 may be coupled to inner cover 220 to support the display generation components, electronic components, power supply, or other components of goggle system 200. Foam 240 may be coupled to the inner surface of inner cover 220 to provide a comfortable fit for the user of goggle system 200. Lens 230 (FIG. 5) may be coupled to the inner surface of inner cover 220 to display images provided by the display generation components of goggle system 200.

Figure 3:
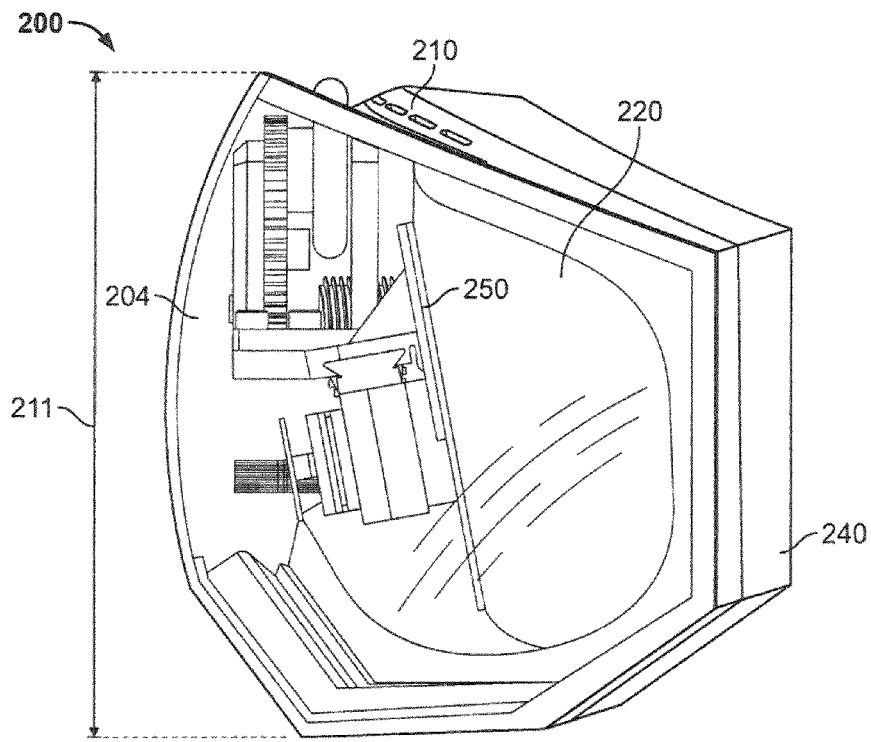
FIG. 3 is a side view of the goggle system of FIG. 2 in accordance with one embodiment of the invention.
Figure 4:
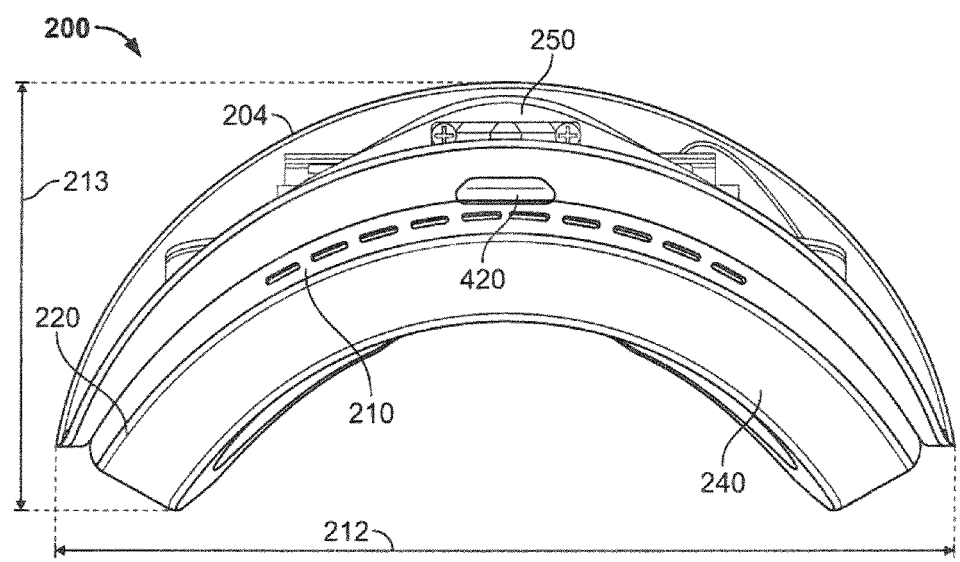
FIG. 4 is a top view of the goggle system of FIG. 2 in accordance with one embodiment of the invention.
Figure 5:
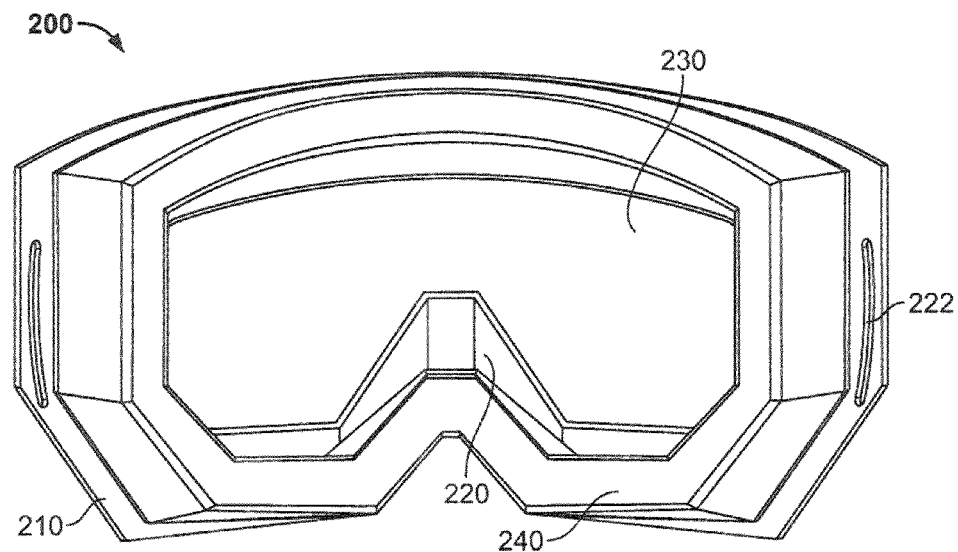
FIG. 5 is a rear view of the goggle system of FIG. 2 in accordance with one embodiment of the invention.

FIG. 3 is a side view of goggle system 200 in accordance with one embodiment of the invention. FIG. 4 is a top view of goggle system 200 in accordance with one embodiment of the invention. FIG. 5 is a rear view of goggle system 200 in accordance with one embodiment of the invention. Goggle system 200 may have any suitable dimension. For example, the height 211 (FIG. 3) of goggle system 200 may be in the range of 65 to 110 mm (e.g., 102 mm) or within any other suitable range (e.g., 80 to 100 mm). As another example, the length 212 of goggle system 200 may be in the range of 60 to 110 mm (e.g., 80 mm) or within any other suitable range (e.g., 70 to 100 mm). As still another example, the width 213 of goggle system 200 may be in the range of 130 to 210 mm (e.g., 188 mm) or within any other suitable range (e.g., 150 to 180 mm).

Figure 6:
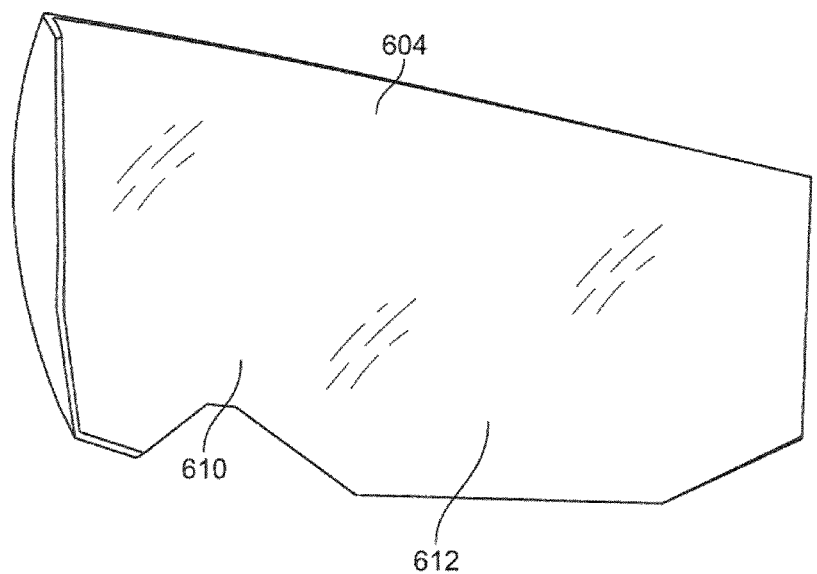
FIG. 6 is a perspective view of an outer cover used in a goggle system in accordance with one embodiment of the invention.

FIG. 6 is a perspective view of an outer cover used in a goggle system in accordance with one embodiment of the invention. Outer cover 604 may include a curved material operative to generally follow the contours of the user's face. The shape of outer cover may be defined or characterized by any suitable characteristic length, angle, curvature or other dimension. For example, outer cover 604 may be characterized by vertical dimensions 610 and horizontal dimension 612. Vertical dimensions 610 and horizontal dimension 612 may be located opposite the position of a particular element of the goggle system (e.g., opposite the display generation components), or at any other suitable location on outer cover 604. In some embodiments, the curvature of outer cover 604 may be designed to allow for clearance of components of goggle system 200 located between outer cover 204 and inner cover 220 (e.g., the movable display generation components).

Once assembled, goggle system 200 may have any suitable appearance. For example, goggle system 200 may resemble ski, snowboard or motorcycle goggles (e.g., include a rounded outer surface following the contour of the user's face). The height (e.g., height 211) and width (e.g., width 213) of goggle system 200 may be selected to approximate the size of ski goggles and reduce the amount of the user's face that is covered by goggle system 200. As another example, goggle system 200 may be incorporated in a hat or helmet, or may include straps or another attaching mechanism operative to be placed over the user's head to secure the goggle system while in use.

Figure 7A:
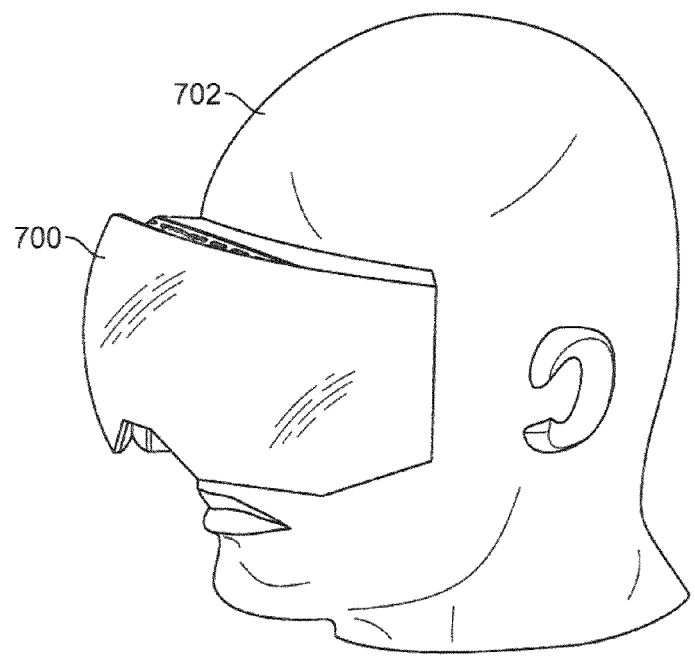
FIG. 7A is a perspective view of a goggle system on a user's head in accordance with one embodiment of the invention.
Figure 7B:
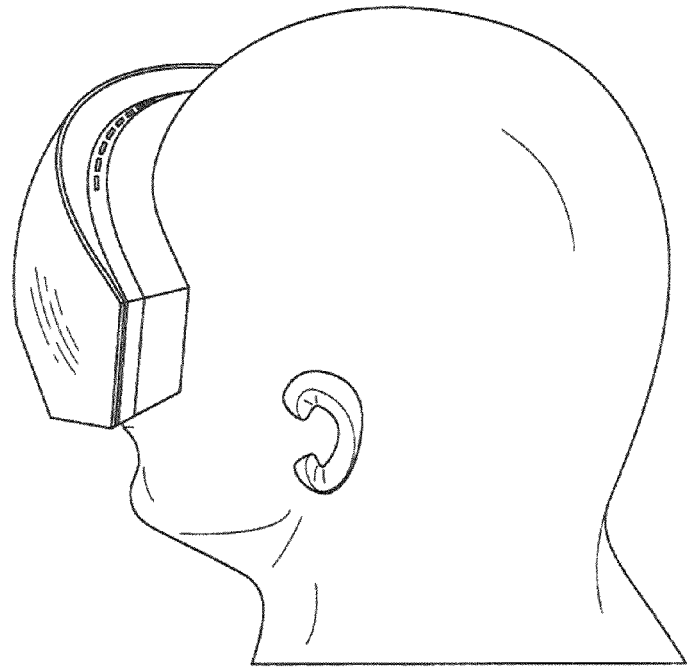
FIG. 7B is a rear perspective view of a goggle system on a user's head in accordance with one embodiment of the invention.
Figure 7C:
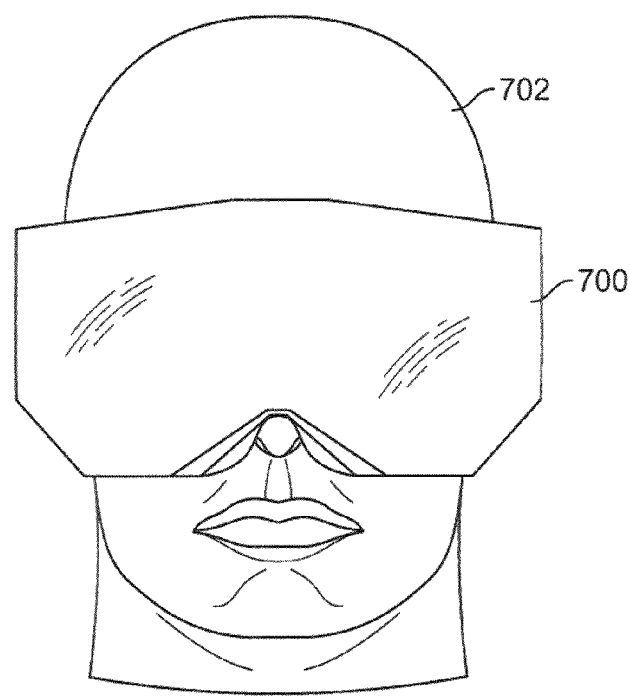
FIG. 7C is a front view of a goggle system on a user's head in accordance with one embodiment of the invention.
Figure 7D:
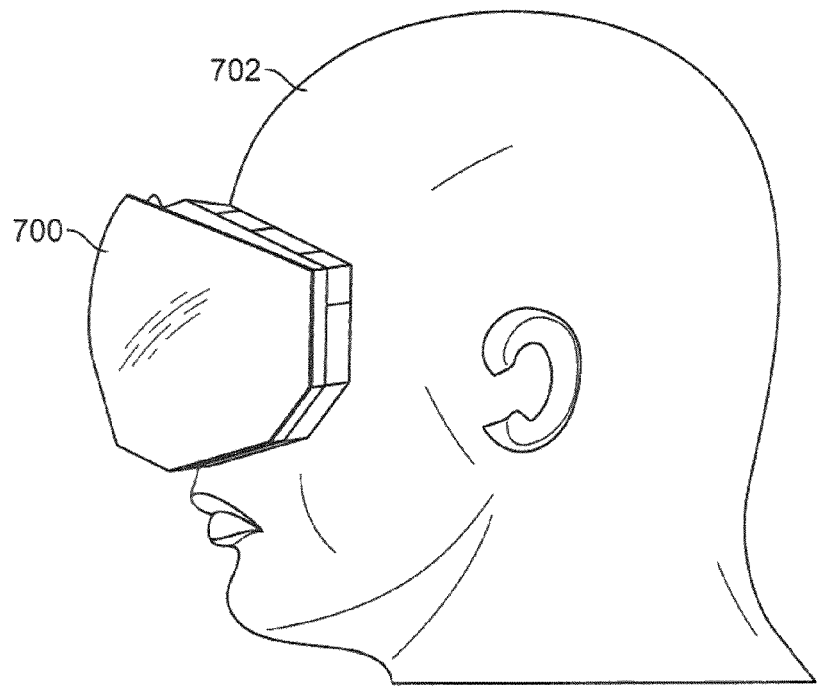
FIG. 7D is a side view of a goggle system on a user's head in accordance with one embodiment of the invention.
Figure 7E:
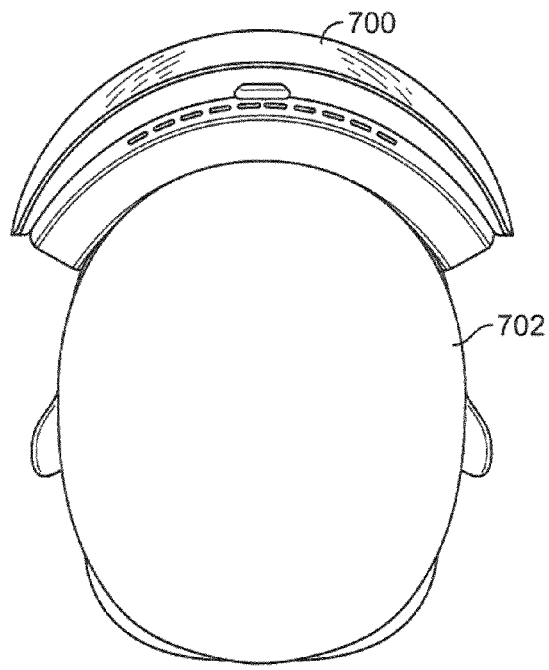
FIG. 7E is a top view of a goggle system on a user's head in accordance with one embodiment of the invention.
Figure 7F:
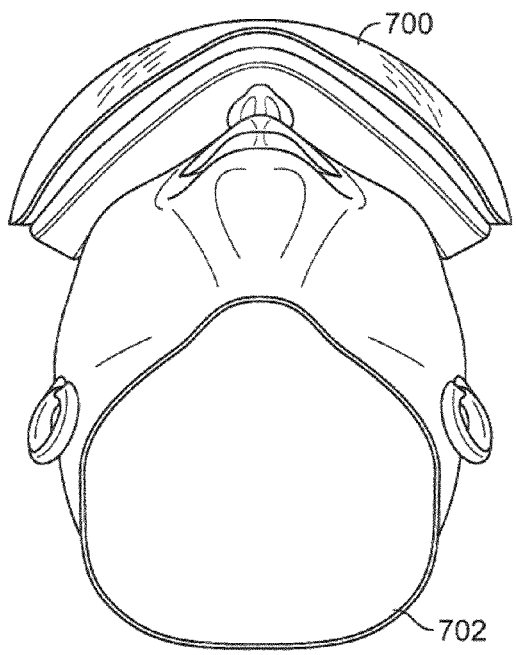
FIG. 7F is a bottom view of a goggle system on a user's head in accordance with one embodiment of the invention.

FIGS. 7A-7F and 8A-8E show a series of schematic views of a goggle system on a user's head in accordance with one embodiment of the invention. In these views, the goggle system displayed resembles ski or motorcycle goggles. FIG. 7A is a perspective view of a goggle system on a user's head in accordance with one embodiment of the invention. FIG. 7B is a rear perspective view of a goggle system on a user's head in accordance with one embodiment of the invention. FIG. 7C is a front view of a goggle system on a user's head in accordance with one embodiment of the invention. FIG. 7D is a side view of a goggle system on a user's head in accordance with one embodiment of the invention. FIG. 7E is a top view of a goggle system on a user's head in accordance with one embodiment of the invention. FIG. 7F is a bottom view of a goggle system on a user's head in accordance with one embodiment of the invention. Goggle system 700 is placed on user's head 702.

Figure 8A:
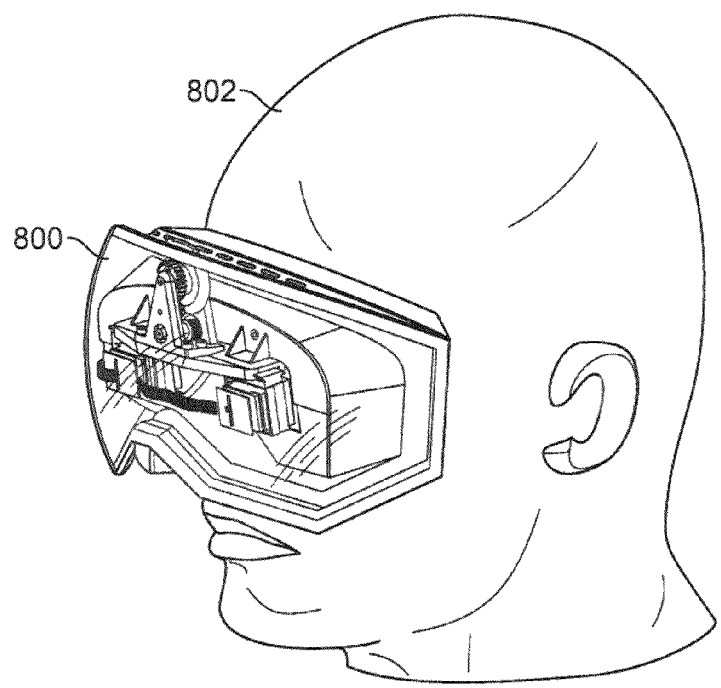
FIG. 8A is a perspective view of a goggle system with a translucent outer cover on a user's head in accordance with one embodiment of the invention.
Figure 8B:
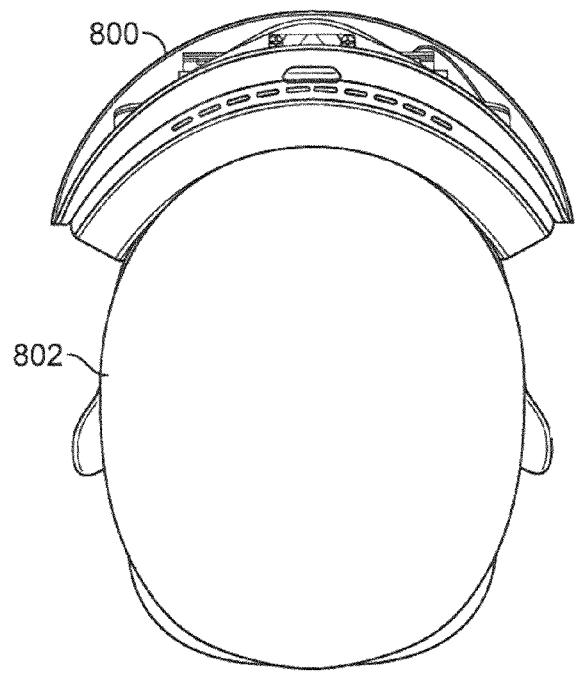
FIG. 8B is a top view of a goggle system with a translucent outer cover on a user's head in accordance with one embodiment of the invention.
Figure 8C:
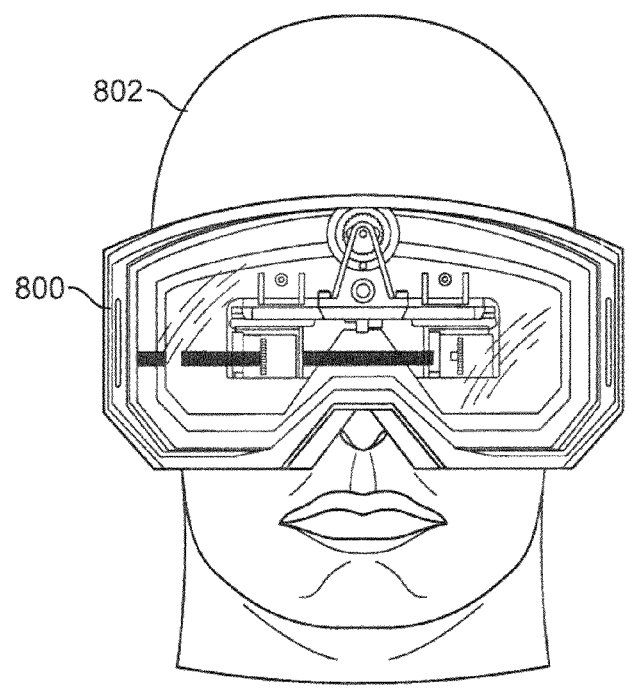
FIG. 8C is a front view of a goggle system without the outer cover on a user's head in accordance with one embodiment of the invention.
Figure 8D:
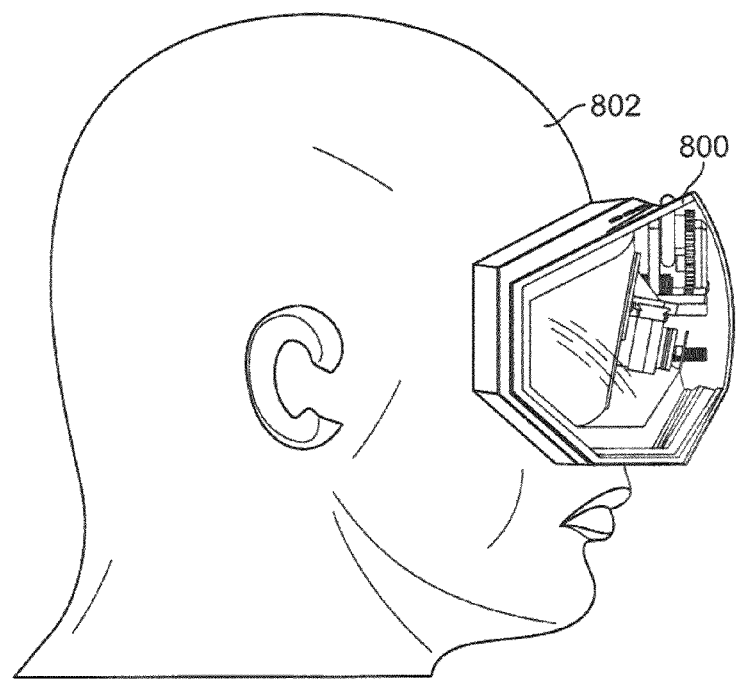
FIG. 8D is a side view of a goggle system without the outer cover on a user's head in accordance with one embodiment of the invention
Figure 8E:
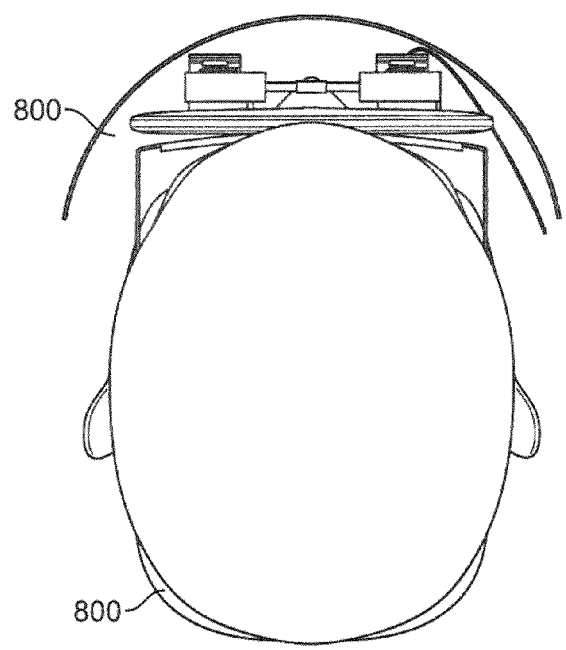
FIG. 8E is a top view of a goggle system without an outer cover on a user's head in accordance with one embodiment of the invention.

FIG. 8A is a perspective view of a goggle system with a translucent outer cover on a user's head in accordance with one embodiment of the invention. FIG. 8B is a top view of a goggle system with a translucent outer cover on a user's head in accordance with one embodiment of the invention. FIG. 8C is a front view of a goggle system without the outer cover on a user's head in accordance with one embodiment of the invention. FIG. 8D is a side view of a goggle system without the outer cover on a user's head in accordance with one embodiment of the invention. FIG. 8E is a top view of a goggle system without an outer cover on a user's head in accordance with one embodiment of the invention. Goggle system 800 is placed on the head of user 802.

Figure 9:
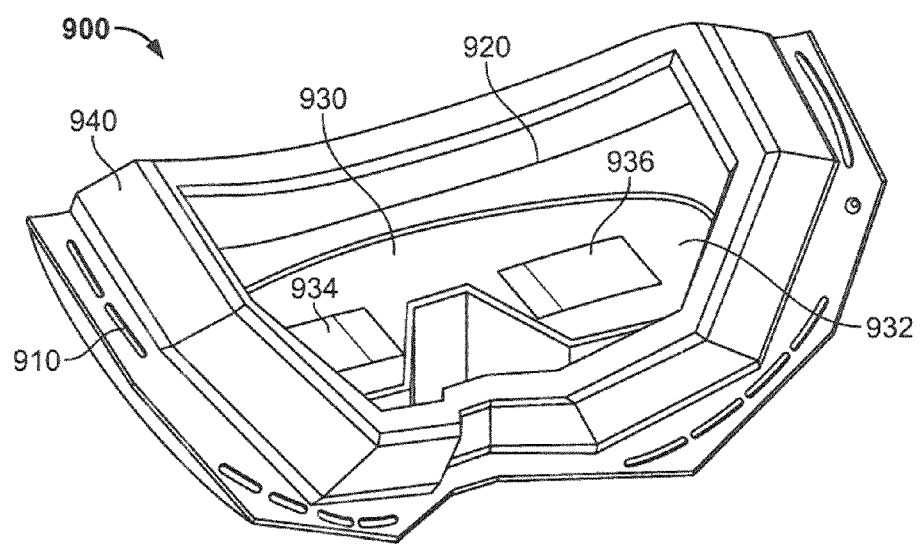
FIG. 9 is a perspective view of an assembled goggle system in accordance with one embodiment of the invention.

FIG. 9 is a perspective view of an assembled goggle system in accordance with one embodiment of the invention. Illustrative goggle system 900 may include mid-frame 910, inner cover 920, foam 940, and lens 930. Inner surface 932 of lens 930 may include left image portion 934 and right image portion 936. Left and right image portions 934 and 936 may be transparent or translucent portions of lens 930 that are aligned with the display generation components of goggle system 900 (not shown, located behind inner cover 920). In contrast, the remaining portion of lens 930 may be opaque or non-reflective for differentiating from left and right image portions 934 and 936. The size of left and right image portions 934 and 936 may be selected to allow for full-screen, widescreen, or panoramic displays of media. As discussed in more detail below, the display generation components of the goggle system may provide the same or different images for each of the left and right image portions 934 and 936, for example to provide optical effects to the media displayed to the user (e.g., 3D effects, or to account for deficiencies in a user's vision).

Returning to FIG. 1, foam 140 may be attached to inner cover 120. In particular, foam 140 may be attached to curved surface 122 to provide a closer fit to a user's face. In some embodiments, foam 140 may be used to prevent ambient light from entering goggle system 100 between the user's face and lens 130. Foam 140 may also serve to increase a user's comfort with goggle system 100. Foam 140 may be formed using a number of different approaches, or combinations of different approaches.

Figure 10:
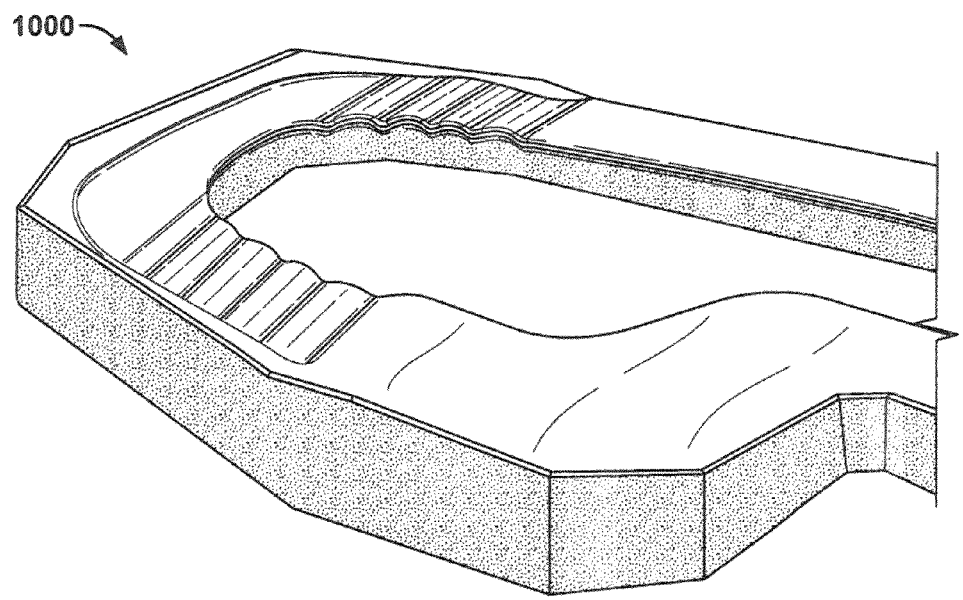
FIG. 10 is a perspective view of foam formed by a first process in accordance with one embodiment of the invention.

FIG. 10 is a perspective view of foam formed by a first process in accordance with one embodiment of the invention. Illustrative foam 1000 may be formed from flock laminated to foam. Different foams, for example foams having different densities, may be die-cut then pressed after lamination to form foam 1000. Foam 1000 may have different densities and different thicknesses at different portions of the foam. In some embodiments, foam 1000 may be gray with black flock.

Figure 11:
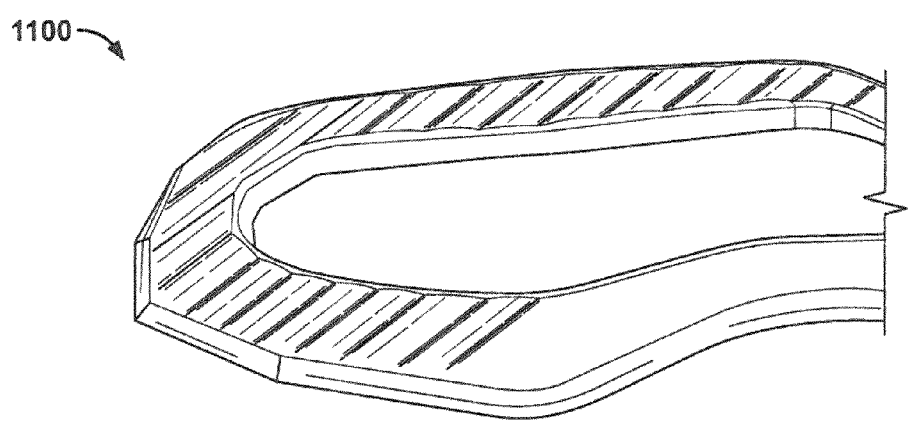
FIG. 11 is a perspective view of foam formed by a second process in accordance with one embodiment of the invention.

FIG. 11 is a perspective view of foam formed by a second process in accordance with one embodiment of the invention. Illustrative foam 1100 may be formed from flock laminated to foam. Different foams, for example foams having different densities, may be pressed together, and then cut after lamination to form foam 1100. In some embodiments, the flock of foam 1100 may be black.

Figure 12:
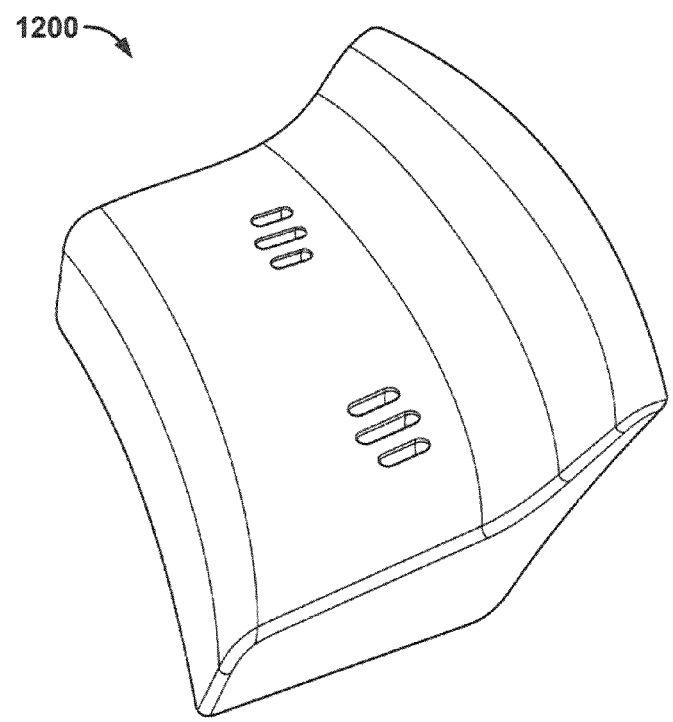
FIG. 12 is a perspective view of foam formed by a third process in accordance with one embodiment of the invention.

FIG. 12 is a perspective view of foam formed by a third process in accordance with one embodiment of the invention. Illustrative foam 1200 may be formed from a polyurethane paint applied to a mold to provide a skin for foam 1200. Once the mold has been painted, foam may be applied in the painted mold. The resulting foam and polyurethane skin may form foam 1200. The amount of foam applied to the painted mold may be varied to vary the thickness of foam 1200. In some embodiments, different types of foam may be applied to vary the density of foam 1200.

Figure 13:
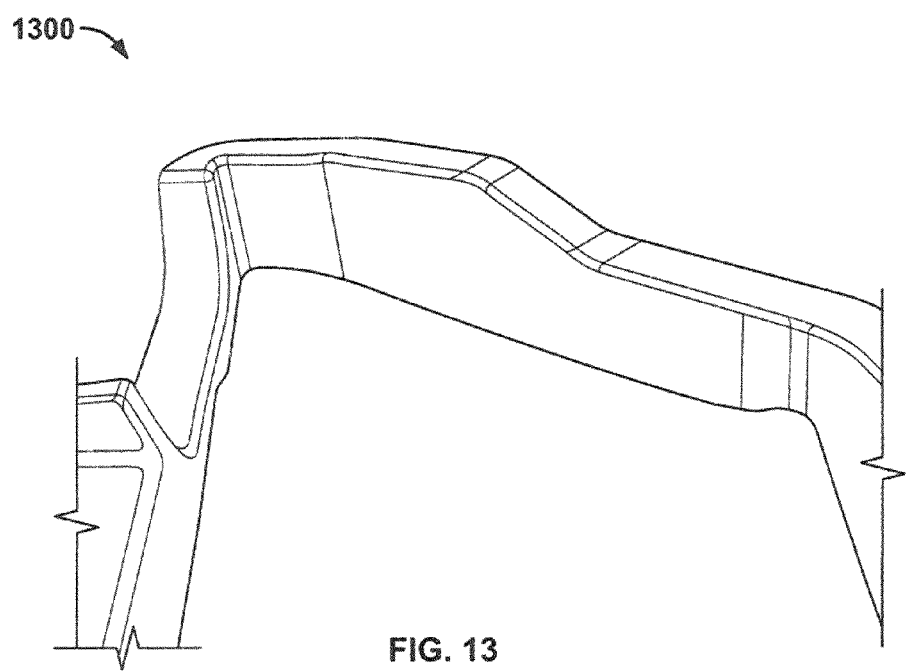
FIG. 13 is a perspective view of foam formed by a fourth process in accordance with one embodiment of the invention.

FIG. 13 is a perspective view of foam formed by a fourth process in accordance with one embodiment of the invention. Illustrative foam 1300 may be formed by first creating a skin, for example by vacuum forming. The skin may be in any suitable material that may be used in vacuum forming. Once the skin has been created, foam may be applied to the skin to form foam 1300. The amount of foam applied to the vacuum formed skin may be varied to vary the thickness of foam 1300. In some embodiments, different types of foam may be applied to vary the density of foam 1300.

Returning to FIG. 1, goggle system 100 may include mounting frame 150 operative to support electronic components of the goggle system, including for example the display generation components goggle system 100. Mounting frame 150 may be coupled to inner cover 120, for example to mounting plate 126. Mounting frame 150 may include a rigid frame operative to support at least the display generation components of goggle system 100 so that the display generation components may be held opposite the user's eyes. Mounting frame 150 may be constructed from any suitable material, including for example from plastic, a composite material, a metal or metallic alloy (e.g., aluminum), combinations thereof, or any other suitable material.

In some embodiments, mounting frame 150 may be configured to remain substantially immobile relative to a user's eyes when inner cover 120 and foam 140 are moved (e.g., when goggle system 100 is adjusted to fit the contours of a user's face). Mounting frame 150 may be coupled to inner cover 120 using any suitable approach, including approaches that allow mounting frame 150 to remain substantially immobile relative lens 130. For example, mounting frame 150 may be coupled to inner cover 120 using an adhesive, tape, a fastener (e.g., a screw or a bold and nut), an interlocking mechanism (e.g., a snap-fit), or any other suitable approach. In some embodiments, mounting frame 150 may include apertures 151 that are configured to be aligned with apertures 121 of inner cover 120 to receive a fastener for coupling mounting frame 150 to inner cover 120. Apertures 121 and 151 may be located adjacent the position of the display generation components such that inner cover 120 may bend without affecting the display of media on the lens.

Figure 14:
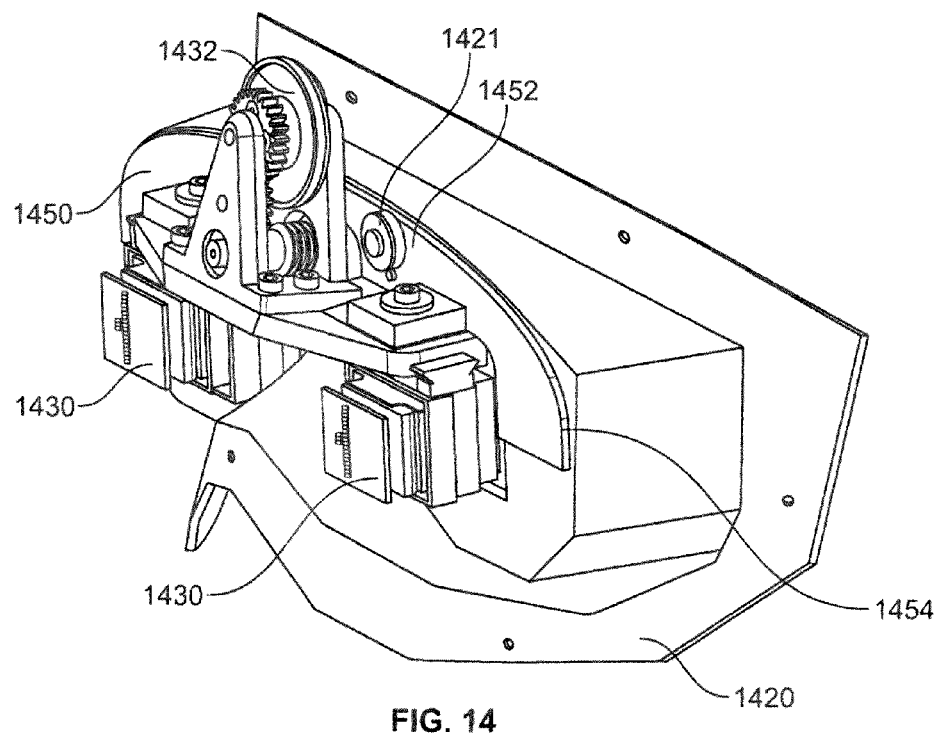
FIG. 14 is a perspective view of a mounting frame assembled to an inner cover of a goggle system in accordance with one embodiment of the invention.

FIG. 14 is a perspective view of a mounting frame assembled to an inner cover of a goggle system in accordance with one embodiment of the invention. Mounting frame 1450 may be operative to support display generation components 1430 by means of support structure 1432 (described in more detail below). Mounting frame 1450 may be coupled to inner cover 1420 using any suitable approach, including for example using a single or several connection points 1422. In the example of FIG. 14, mounting frame 1450 may include aperture 1452 operative to be aligned with a feature of inner cover 1420 (e.g., an aperture or a connector embedded in inner cover 1420). Connector 1421, which may be integrated within inner cover 1420, may be operative to pass through aperture 1452 to couple mounting frame 1450 to inner cover 1420. In some embodiments, other coupling mechanisms may be used instead of or in addition to connector 1421, including for example several connectors, adhesives, heat treatment, hook and fastener material, or any other suitable coupling mechanism.

Aperture 1452, and the corresponding feature of inner cover 1420, may be located at any suitable position relative to the edges of mounting frame 1450 and inner cover 1420. For example, aperture 1452 and the feature of inner cover 1420 may be located adjacent the centerline of goggle system 1400. To prevent mounting frame 1450 from rotating or twisting relative inner cover 1420, aperture 1452 may be constructed using an asymmetrical shape (e.g., an oval or a polygon), or mounting frame 1450, inner cover 1420, or both may include a second feature (e.g., a pin in mounting frame 1450 extending into an aperture in inner cover 1420) to prevent the rotation of mounting frame around connector 1452. In some embodiments, to further reduce movement of mounting frame 1450, mounting wings 1454 of mounting frame 1450 may be secured to inner cover 1420 (e.g., using an adhesive).

Figure 15:
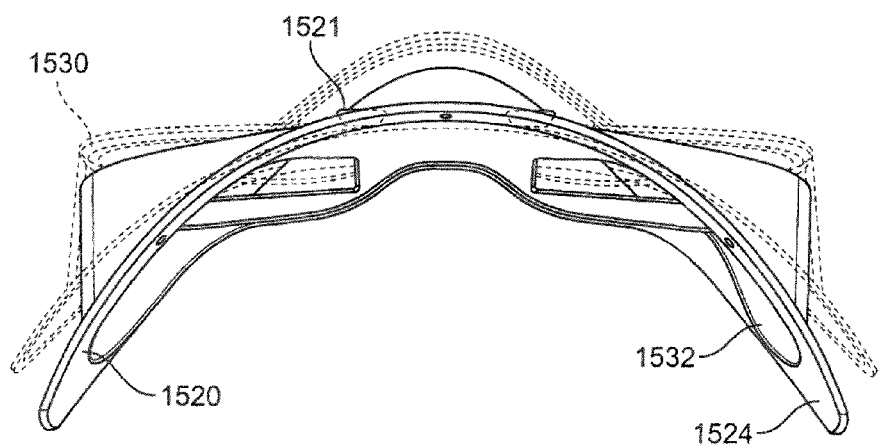
FIG. 15 is a schematic view of a goggle system as the inner cover flexes in accordance with one embodiment of the invention.

In some embodiments, mounting frame 1450 may be coupled to inner cover 1420 such that inner cover may bend relative mounting frame 1450 to enhance the fit of goggle system 1400 around the user's face. FIG. 15 is a schematic view of a goggle system as the inner cover flexes in accordance with one embodiment of the invention. Goggle system 1500 may include inner cover 1520, to which a mounting frame may be coupled using connectors 1521. Inner cover may flex from initial position 1530 (indicated in wire frame) to final position 1532. The amount of movement of each portion of inner cover 1520 is indicated by the shade used to draw final position 1532. In particular, curved surface 1534, near the outer edge of inner cover 1520 may have moved a large amount, while connectors 1521, and by extension the mounting plate, may have moved very little, perhaps imperceptibly.

Figure 16:
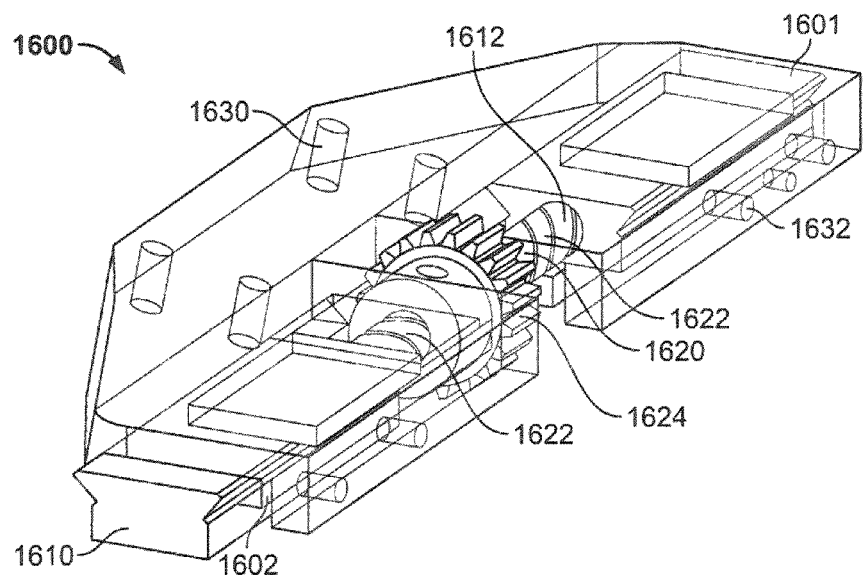
FIG. 16 is a perspective view of an illustrative bottom frame in accordance with one embodiment of the invention.

Returning to FIG. 1, mounting frame 150 may support the display generation components 160 of goggle system 100 using any suitable approach. For example, bottom frame 152, dovetailed followers 154 and display adjust mechanism 156 may be coupled to mounting frame 150 and operative to support display generation components 160 of goggle system 100. FIG. 16 is a perspective view of an illustrative bottom frame in accordance with one embodiment of the invention. Bottom frame 1600 may include frame 1601 that includes slots 1602 for receiving dovetailed followers 1610. Dovetailed followers 1610 may be coupled to tube 1620 via apertures 1612. Tube 1620 may include screws 1622, and apertures 1612 may include corresponding grooves (not shown) such that when tube 1620 rotates, screws 1622 engage or disengage grooves in apertures 1612, thus causing dovetailed followers 1610 to translate laterally along the axis of tube 1620. This movement may allow a user to move the display generation components (e.g., display generation components 160, FIG. 1), which may be coupled to dovetailed followers 1610, to align the display generation components with the user's eyes. In some embodiments, tube 1620 may include two decoupled portions such that a user can rotate only half of tube 1620 at a time, thus moving only one of the dovetailed followers 1610 at a time.

Bottom frame 1600 may include gear 1624 coupled to tube 1620, such that gear 1624 rotates when tube 1620 rotates. If tube 1620 is decoupled into several portions, bottom frame 1600 may include several gears 1624, one for each portion. Bottom frame 1600 may be coupled to any suitable element or assembly operative to control the rotation of tube 1620. For example, bottom frame 1600 may be coupled to a display adjust mechanism that includes a second gear operative to engage gear 1624 for controlling the position of dovetailed followers 1610.

Bottom frame 1600 may include pads 1630 for coupling bottom frame 1600 to a mounting frame of the goggle system (e.g., mounting frame 150, FIG. 1). For example, protrusions 153 of mounting frame 150 (FIG. 1) may be configured to engage pads 1630 using any suitable approach. For example, protrusions 153 may be coupled to pads 1630 using a press fit, an adhesive, an interlocking mechanism, a snap-fit mechanism, a fastener, a combination thereof, or any other suitable mechanism or combination of mechanisms. Alternatively, or in addition, bottom frame 1600 may include openings 1632 operative to receive fasteners or features of the mounting frame for coupling bottom frame 1600 to the mounting frame (e.g., mounting frame 150, FIG. 1).

Figure 17:
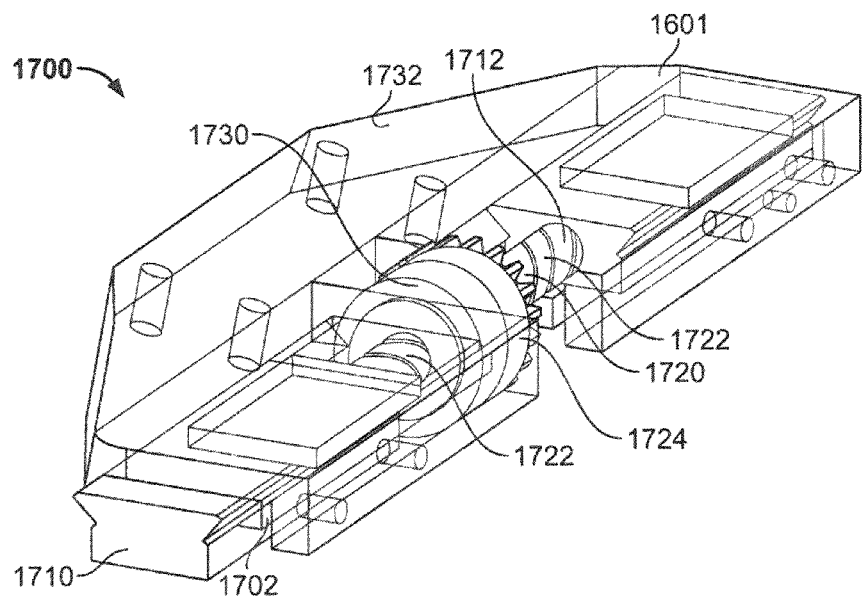
FIG. 17 is a perspective view of another bottom frame in accordance with one embodiment of the invention.

FIG. 17 is a perspective view of another bottom frame in accordance with one embodiment of the invention. Illustrative bottom frame 1700 may be substantially similar to bottom frame 1600, and may include frame 1701, slots 1702, dovetailed followers 1710, apertures 1712, tube 1720, screws 1722, and gear 1724. In addition, bottom frame 1700 may include wheel 1730. Wheel 1730 may be coupled to tube 1720 such that when a user rotates wheel 1730, tube 1720 rotates as well, causing dovetailed followers 1710 to move laterally.

In some embodiments, wheel 1730 may extend from top surface 1732 or bottom surface 1734 of bottom frame 1700 such that a user may directly access wheel 1730 to move dovetailed followers 1710. For example, wheel 1730 may be configured to extend out of mid-frame 710 (e.g., through opening 420, FIG. 4).

Figure 18:
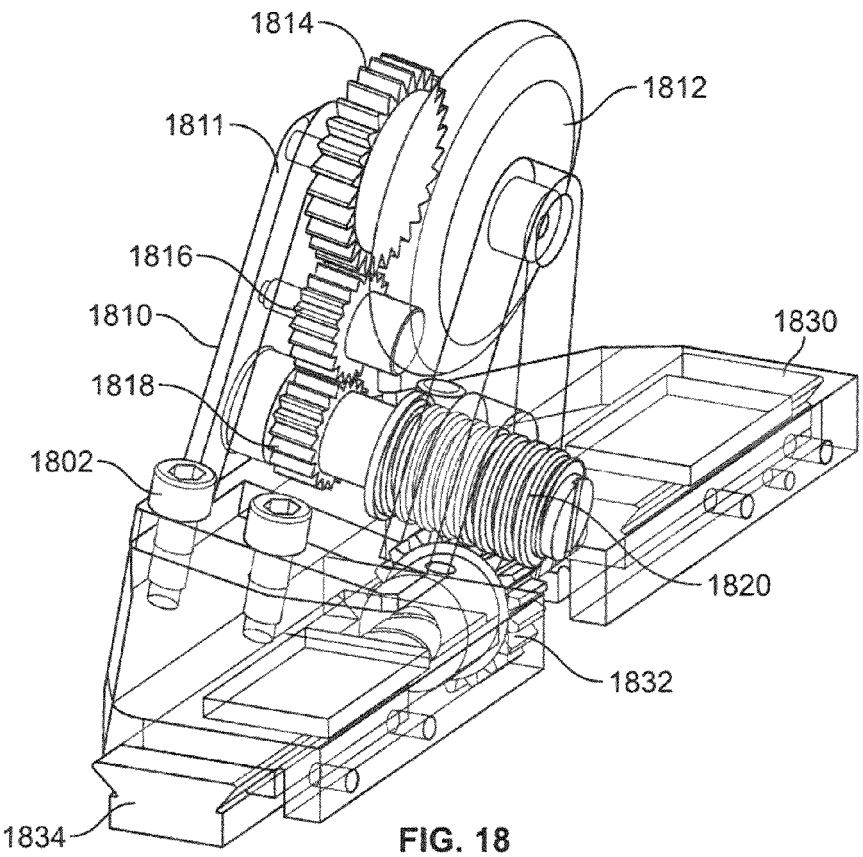
FIG. 18 is a perspective view of a display adjust mechanism coupled to a bottom frame in accordance with one embodiment of the invention.

In some embodiments, a display adjust mechanism may be coupled to the bottom frame (e.g., bottom frame 1600 or bottom frame 1700) to control the movement of the dovetailed followers (e.g., which support the display generation components). FIG. 18 is a perspective view of a display adjust mechanism coupled to a bottom frame in accordance with one embodiment of the invention. Display adjust mechanism 1810 may be coupled to bottom frame 1830 using fasteners 1802 (e.g., engaging pads 1630, FIG. 16). In some embodiments, one or more other attachment mechanisms may be used instead or in addition to couple display adjust mechanism 1810 to bottom frame 1830.

Display adjust mechanism 1810 may include wheel 1812 for allowing a user to control dovetailed followers 1834 inserted in bottom frame 1830. Wheel 1812 may be coupled to first gear 1814, which may be placed adjacent to second gear 1816, which may in turn be placed adjacent to third gear 1818. Third gear 1818 may then engage worm gear 1820, which may engage gear 1832 of bottom frame 1830, such that when the user rotates wheel 1812, gear 1832 rotates and causes dovetailed followers 1834 to move laterally. Support structure 1811 may include several apertures or other structural features operative to support the axes on which gears 1814, 1816, 1818, and 1820 are placed.

To align the display generation components of the goggle system with the user's eyes, the user may rotate wheel 1812 to cause dovetailed followers 1834, and the display generation components coupled to dovetailed followers 1834 (e.g., coupled to the bottom surface of dovetailed followers 1834), to translate until the display generation components are in a satisfactory position. In some embodiments, wheel 1812 may be configured to rotate 1.8 times to cause dovetailed followers 1834, and thus the display generation components, to move from 55 mm separation to 81 mm separation. Alternatively, the size, number of gears, and pitch of the screws may be modified to change the relation between the rotation of wheel 1812 and the movement of dovetailed followers 1834.

To provide easy access to wheel 1812, the mid-frame may include an aperture (e.g., aperture 420, FIG. 4) through which at least a portion of wheel 1812 may extend. The aperture and the wheel may be designed to minimize the free space surrounding the wheel to limit foreign particles from entering the goggle system and affecting the display generation components. For example, the aperture may include a silicone or rubber ring, or brush elements operative to contact wheel 1812 to further eliminate space between wheel 1812 and the aperture in the goggle system through which debris may enter. Alternatively, or in addition, the goggle system may include a cover or covering element operative to be placed over the aperture and wheel 1812 when the wheel is not in use to prevent particles from entering the goggle system.

In some embodiments, display adjust mechanism 1810 may be coupled to an actuator or motor for automatically displacing dovetailed followers 1834. The actuator or motor may be controlled by control circuitry embedded in the goggle system, or by control circuitry remote from the goggle system (e.g., connected to the goggle system wirelessly or by a wire). In some embodiments, the user may actuate the motor using a suitable user interface (e.g., embedded on or coupled to the goggle system, or using an electronic device coupled to the goggle system). In some embodiments, the goggle system may automatically control the actuator or motor by determining where a user's eyes are (e.g., using suitable sensing circuitry, such as light sensing circuitry) and may move dovetailed followers 1834 such that the display generation components are automatically aligned with the user's eyes.

Figure 19A:
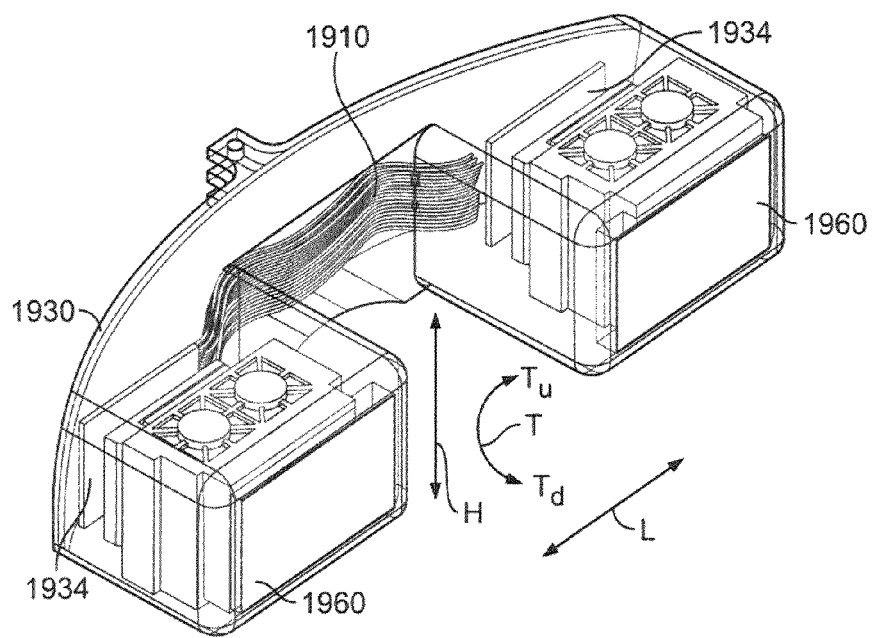
FIGS. 19A and 19B are a perspective view and a top view of another display adjust mechanism coupled to a bottom frame in accordance with one embodiment of the invention.
Figure 19B:
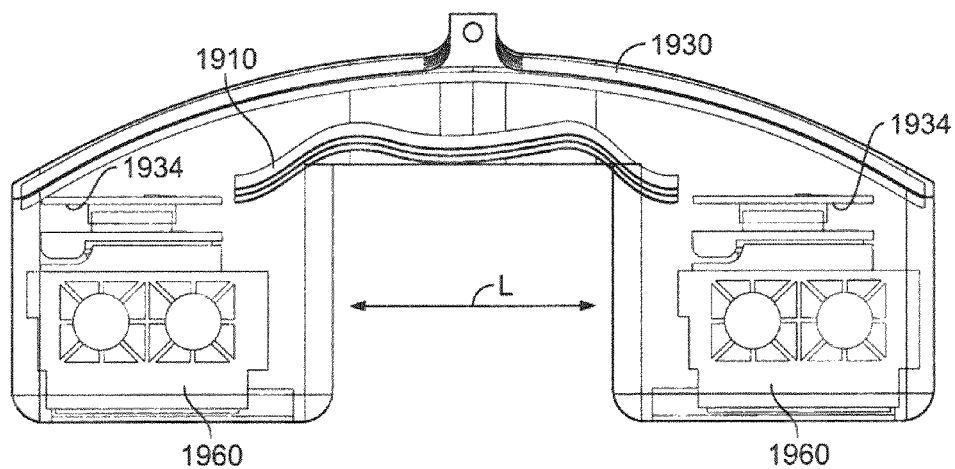

FIGS. 19A and 19B are a perspective view and a top view of another display adjust mechanism coupled to a bottom frame in accordance with one embodiment of the invention. Display adjust mechanism 1910 may be coupled to bottom frame 1930 having dovetailed followers 1934 with display generation components 1960. As opposed to display adjust mechanism 1810 of FIG. 18 which is shown to be coupled on top of frame 1830 above dovetailed followers 1834, display adjust mechanism 1910 may be coupled to the front of frame 1930 between dovetailed followers 1934, as shown in FIG. 19A for example. This may allow the height of the goggle system to be reduced.

Figure 20A:
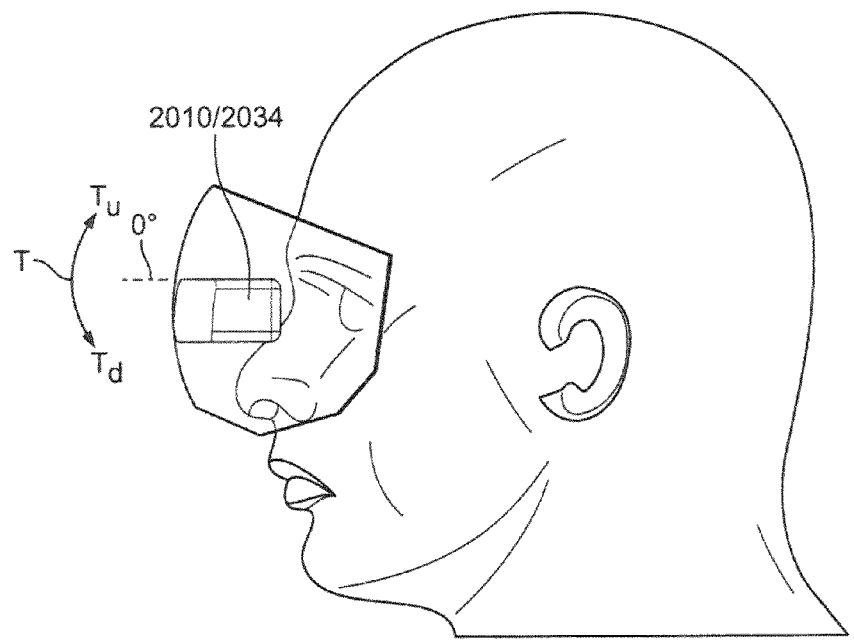
FIGS. 20A-C are side views of an illustrative goggle system as a display adjust mechanism tilts dovetailed followers in accordance with one embodiment of the invention.
Figure 20B:
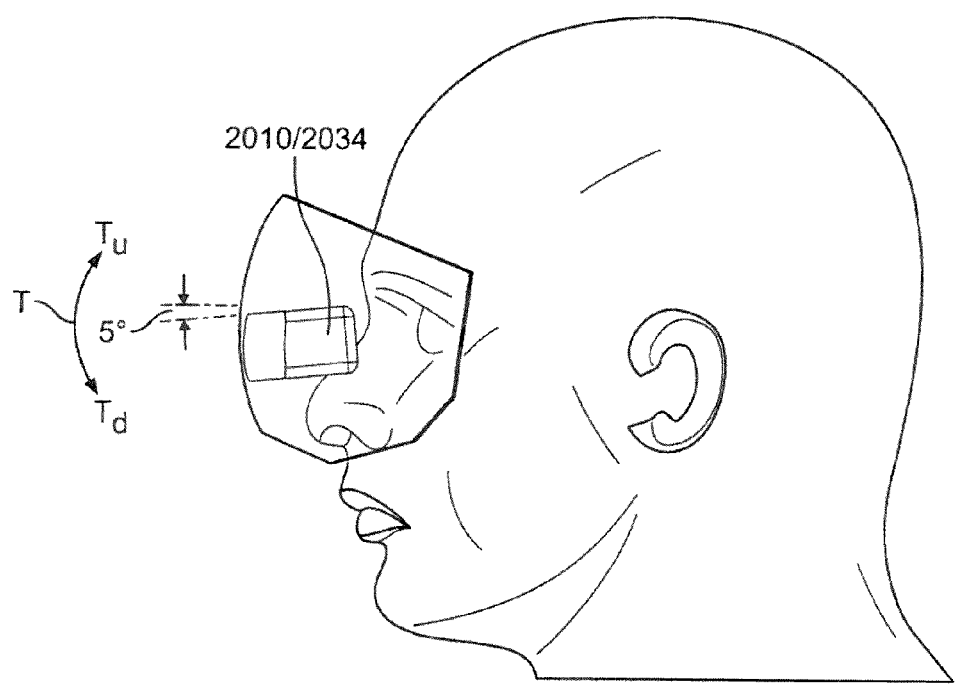
Figure 20C:
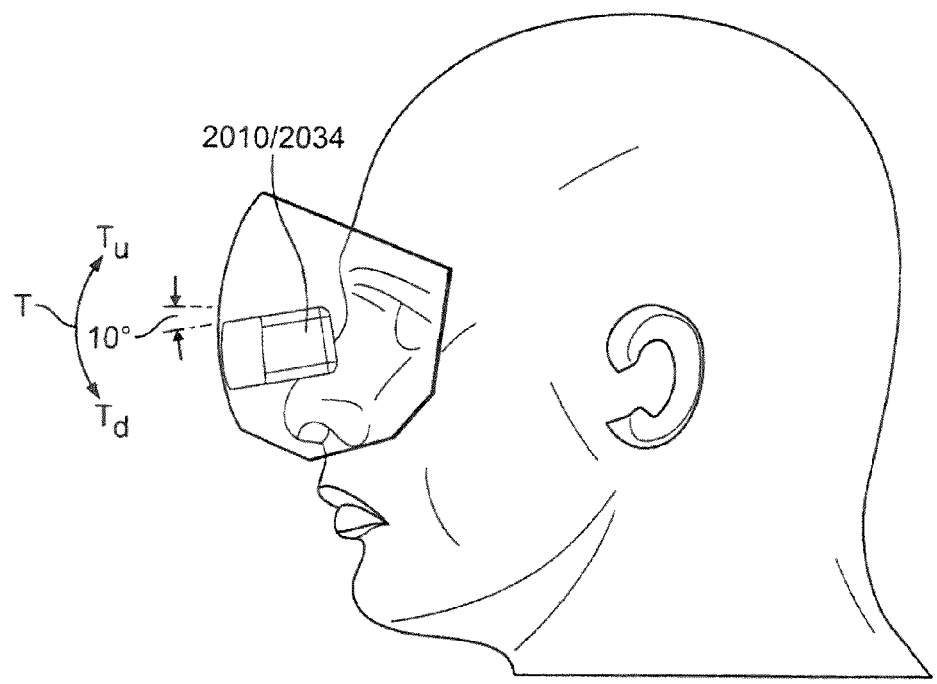

In some embodiments, display adjust mechanism 1910 may be operative to move dovetailed followers 1934 in directions other than laterally in the direction of arrows L. For example, display adjust mechanism 1910 may be operative to move dovetailed followers 1934 up and down in the direction of arrows H, to tilt dovetailed followers 1934 up and down in the direction of arrows Tu and Td, or both. FIGS. 20A-C are side views of an illustrative goggle system as a display adjust mechanism tilts dovetailed followers in accordance with one embodiment of the invention. As display adjust mechanism 2010 tilts dovetailed followers 2034 down in the direction of arrow Td, the distance between the display generation components and the user's nose may decrease. To prevent the user's nose from interfering with the movement of the display generation circuitry, a compressible foam element may be provided to compress when dovetailed followers 2034 and the display generation components coupled thereto are tilted down in the direction of arrow Td.

In some embodiments, display adjust mechanisms 1910, 2010 or both may be coupled to an actuator or motor for electrically displacing dovetailed followers 1934 and 2034, respectively. The actuator or motor may be controlled by signals provided by control circuitry of the goggle system or control circuitry remote from the goggle system (e.g., connected to the goggle system wirelessly or by a wire). In some embodiments, the user may actuate the motor using a suitable user interface (e.g., embedded on or coupled to the goggle system, or using an electronic device coupled to the goggle system). In some embodiments, the goggle system may automatically control the actuator or motor by determining where a user's eyes are (e.g., using suitable sensing circuitry, such as light sensing circuitry) and may move dovetailed followers 1834 in any of the directions H, L, and T such that the display generation components are automatically aligned with the user's eyes.

Returning again to FIG. 1, circuit board 161 and optical module 162 may be coupled to form each display generation component 160 of goggle system 100. Each circuit board 161 may be operative to at least partially direct the operations of optical module 162. For example, each circuit board 161 may be operative to receive media for display from a media source, and provide the appropriate media signals to each optical module 162. In some embodiments, a circuit board 161 may include power circuitry operative to direct or provide power to optical module 662, receive and process user inputs (e.g., user inputs received from cable 164 or from a user interface integrated in goggle system 100), and provide images and video to optical module 162. In some embodiments, each circuit board 161 may include or may be coupled to one or more batteries, for example a rechargeable battery, for conditioning the received power and providing the conditioned power to optical modules 162.

Optical modules 162 may be coupled to dovetailed followers 154 using any suitable mechanism. For example, optical modules 162 may be coupled to dovetailed followers 154 using a fastener (e.g., a bolt), an adhesive, tape, a mating feature, or any other suitable approach. In some embodiments, optical modules 162 may be removably coupled to dovetailed followers 154 to allow for easier replacement or repair. Optical modules 162 may include any suitable modules for receiving a media signal (e.g., an image or a video signal) and generating a display corresponding to the media on lens 130.

In some embodiments, optical modules 162 may be operative to adjust or modify the displayed media based on any suitable criteria (e.g., as standalone modules or using circuit board 161). For example, optical modules 162 may be operative to resize or otherwise modify an image such that the image appears to be displayed at a greater distance than the distance between optical modules 162 and the user's eyes (e.g., the image appears to be viewed from 4 meters and not 20 mm). As another example, optical modules 162 may be operative to generate media displays that correspond to standard definition or high definition images.

In some embodiments, left and right optical modules 162 may generate and display different images associated with the received media. For example, optical modules 162 (e.g., upon receiving appropriate instructions from circuit board 161), may offset left and right images so that the user is given the illusion of viewing media in three dimensions. The optical modules 162 may identify the appropriate left and right images using any suitable approach, including for example receiving separate left and right images from the media source, or generating left and right images from the single media provided by the media source.

As another example, left and right optical modules 162 may adjust the images displayed to account for limitations or corrections (e.g., by glasses or contact lens) of the user's eyesight. For example, if a user is myopic in one eye, the optical module 162 associated with that eye may modify the image displayed to correct the user's myopia. The goggle system may determine the correction required for each eye, if any, using any suitable approach. For example, the user may enter a glasses or contact lens prescription that indicates the required correction. As another example, each optical module 162 may automatically analyze the user's eyes, and determine the adjustment needed based on the analysis. This may allow users who normally wear glasses to use goggle system 100 without their glasses, which may lead to discomfort.

The goggle system may be operative to store a user's display generation component settings in memory. For example, the goggle system may store eyesight correction values (if any), the position of the display generation components (e.g., along 3 axes), a preferred volume level, or any other preference related to the user's interaction with the system. When the user puts on the goggle system, the system may identify the user and retrieve from memory the goggle system settings associated with the user. The goggle system may identify the user in response to a user input (e.g., the user logs in, or selects a particular profile from a menu), or the goggle system may automatically identify the user (e.g., using a retina or fingerprint scan, or voiceprint analysis).

Figure 21A:
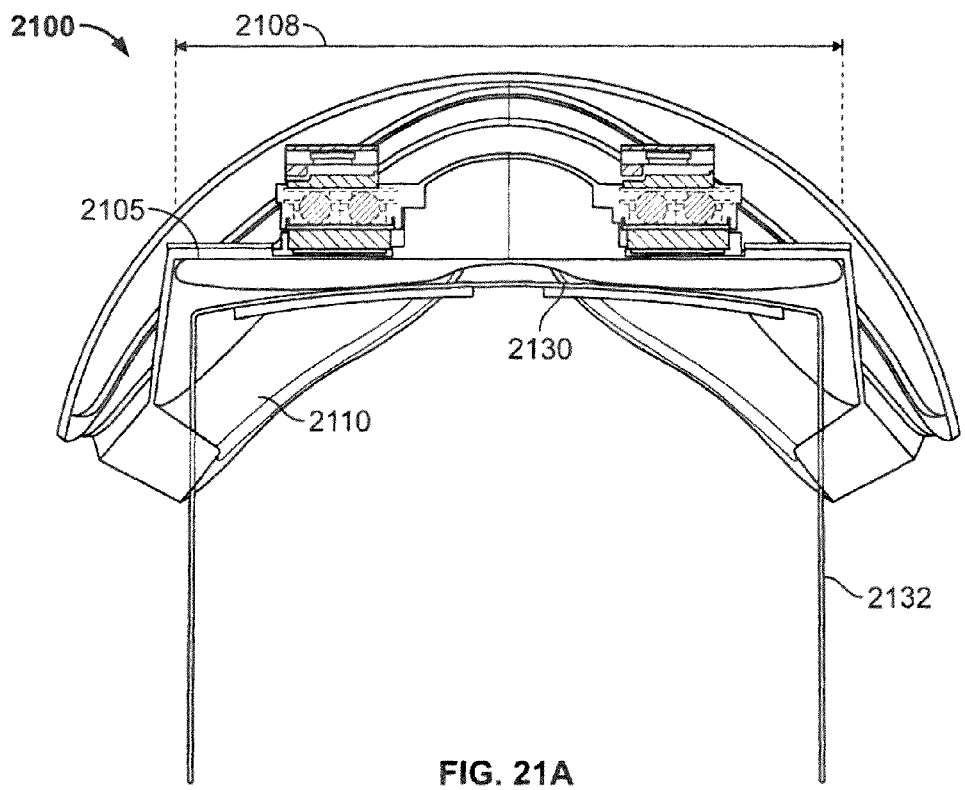
FIGS. 21A-C are a top view, side view, and perspective view of a goggle system used in conjunction with eyeglasses in accordance with one embodiment of the invention.
Figure 21B:
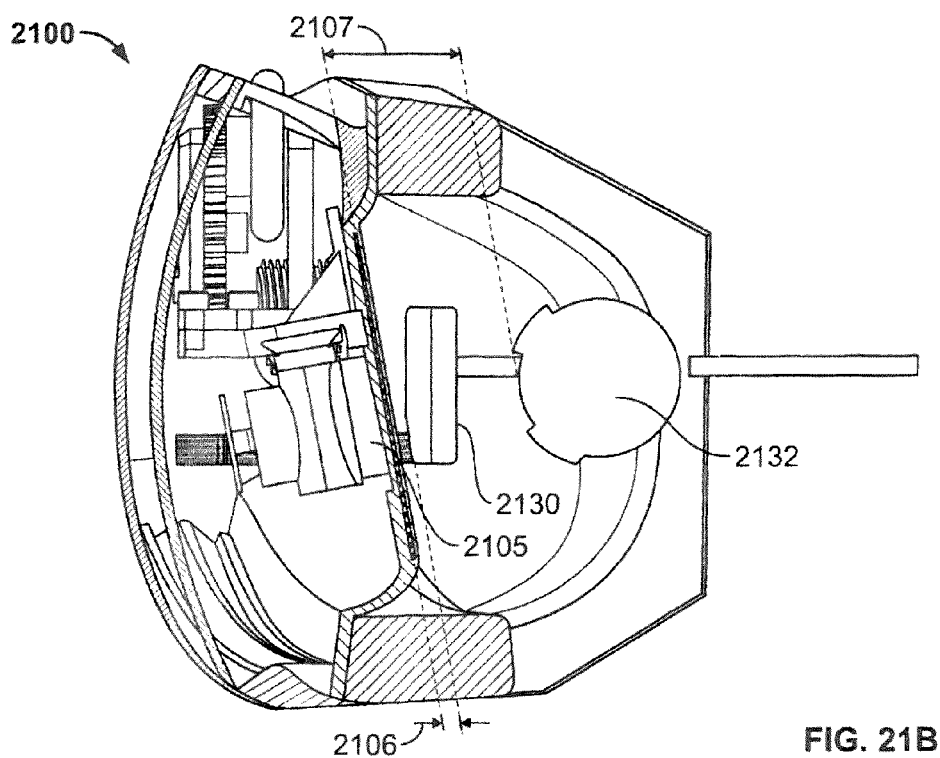
Figure 21C:
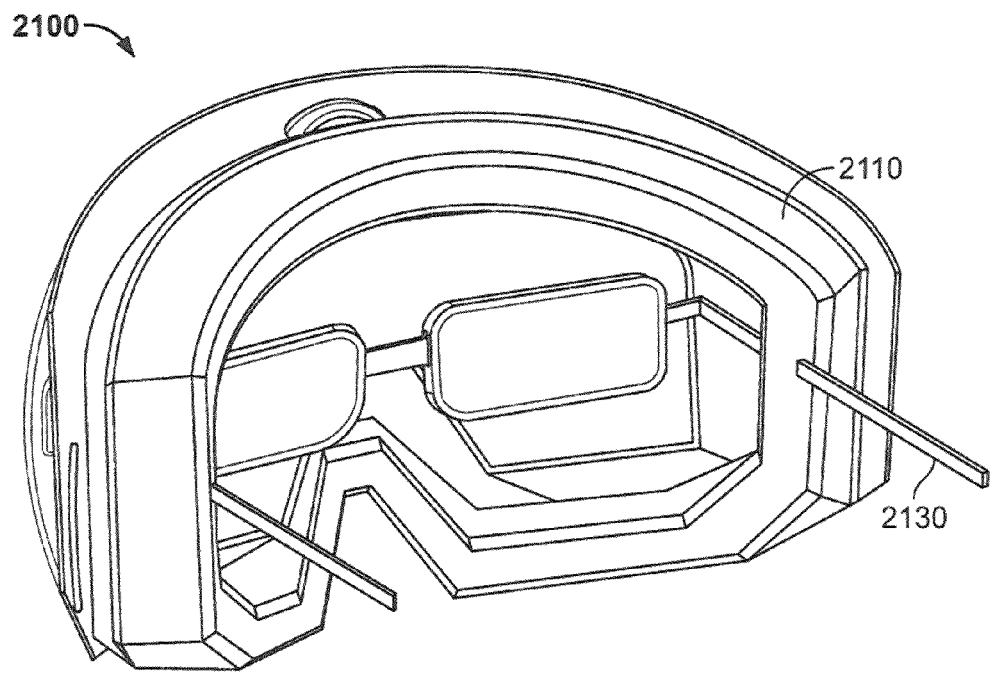

FIGS. 21A-C are a top view, side view, and perspective view of a goggle system used in conjunction with eyeglasses in accordance with one embodiment of the invention. Illustrative goggle system 2100 may include inner lens 2105 and foam 2110. To ensure that the experience of a user with eyeglasses remains enjoyable, inner lens 2105, foam 2110, and other components of goggle system 2100 may be selected such that when in use, the eyeglasses 2130 approach, but do not contact, inner lens 2105. Distance 2106 between eyeglasses 2130 and inner lens 2105 may be selected to limit the interference between eyeglass lens 2130 and inner lens 2105. For example, distance 2106 may be in the range of 0.25 to 5.0 mm (e.g., 1.7 mm). Inner lens 2105 may also be positioned such that distance 2107 between inner lens 2105 and eye 2132 reduces the stress on the user's eyes as the user watches media on lens 2105. For example, distance 2107 may be in the range of 10 to 40 mm (e.g., 20 mm).

In some embodiments, length 2108 of lens 2105 may be selected such that length 2108 is larger than the length of a user's eyeglasses. For example, length 2108 may be in the range of 120 to 160 mm (e.g., 140 mm). Eyeglass temples 2132 may come into contact with one or more portions of foam 2110 to ensure that no ambient light affects the media displayed on inner lens 2105. Foam 2110 may be wrapped around eyeglass temples 2132 such that foam 2110 substantially contacts the user's face in the vicinity of eyeglass temple 2132. Using the approach described above, however, whereby each optical module 162 provides different images based on the user's vision, any limitations or discomfort caused by wearing glasses may be eliminated.

Figure 22:
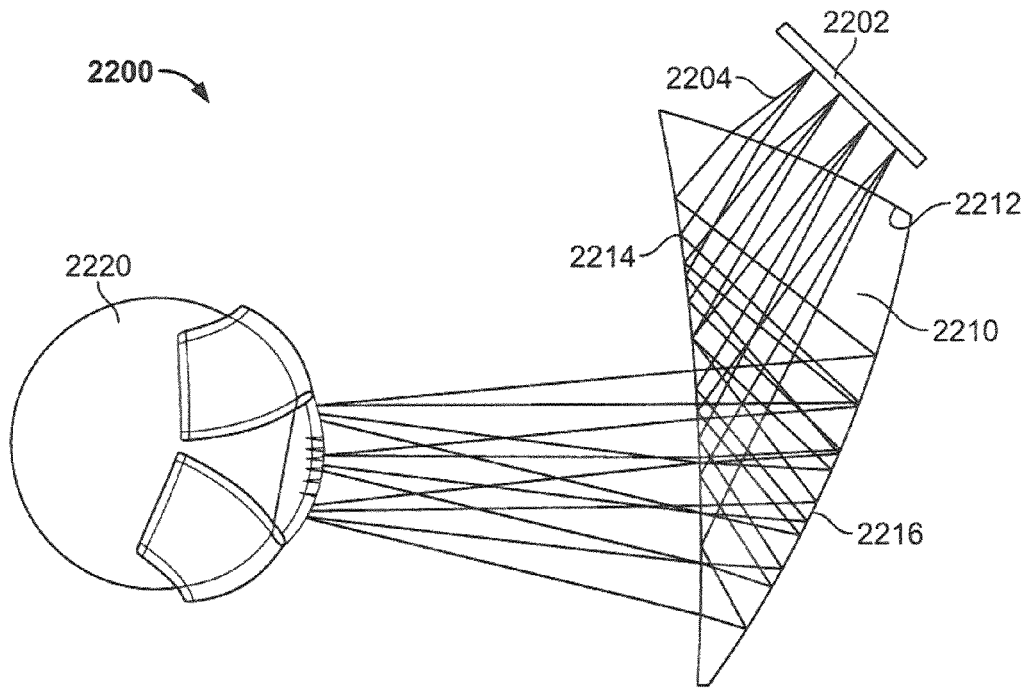
FIG. 22 is a schematic view of an illustrative optical module that uses a free shaped prism in accordance with one embodiment of the invention.

Optical modules 162 may be constructed in any suitable shape. In some embodiments, optical modules 162 may include a free shaped prism. FIG. 22 is a schematic view of an illustrative optical module that uses a free shaped prism in accordance with one embodiment of the invention. Optical module 2200 may include image source 2202, which may provide several light waves 2204 that form an image. Light waves 2204 may enter first face 2212 of free shaped prism 2210, where light waves 2204 may be refracted. Light waves 2204 may then impact second face 2214 of free shaped prism 2210, and subsequently be reflected to third face 2216 of free shaped prism 2210. Light waves 2204 may finally pass through second face 2214 and reach the user's eye 2220.

The shapes of first, second, and third faces 2212, 2214, and 2216 of prism 2210 may be complex shapes operative to reflect light received from images source 2202 in specific manners. In particular, the shapes may be designed such that every light wave 2204 emitted by source 2202 spends the exact same amount of time refracting and reflecting within prism 2210 such that all of the light waves 2204 that were emitted at a single point in time reach the user's eye at the same time. In some cases, the creation of faces 2212, 2214 and 2216 may require significant engineering efforts to design and manufacture.

Figure 23:
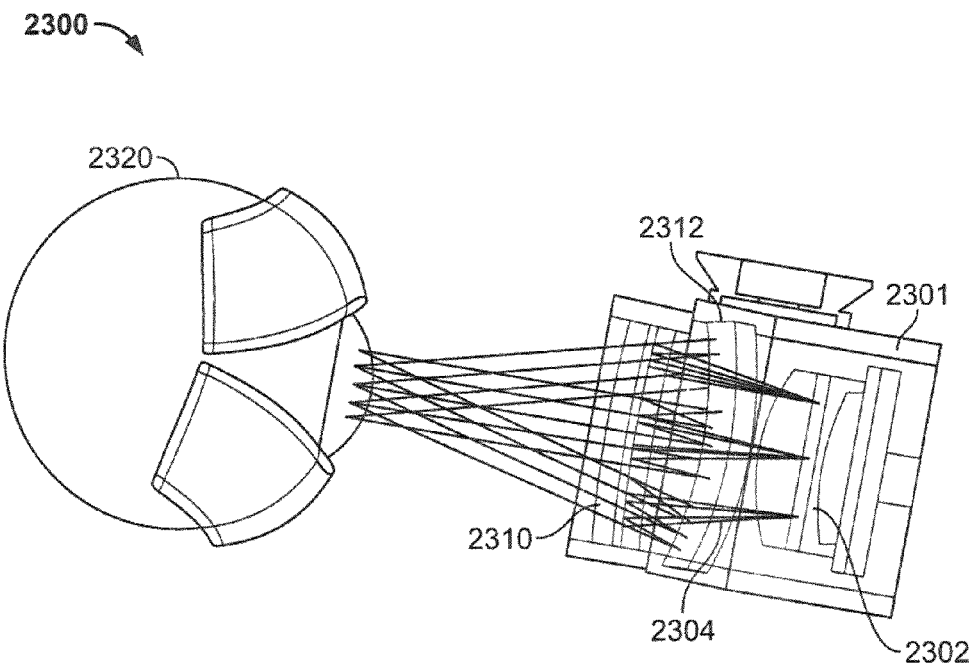
FIG. 23 is a schematic view of an illustrative optical module that uses an inline reflective optical collimator to provide images to the user in accordance with one embodiment of the invention.

FIG. 23 is a schematic view of an illustrative optical module that uses an inline reflective optical collimator to provide images to the user in accordance with one embodiment of the invention. Optical module 2300 may include inline reflective optical collimator 2301, and image source 2302 may be incorporated within collimator 2301. When light waves 2304 of an image are emitted by image source 2302, the light waves may be reflected by reflective surface 2310, and in turn be reflected again by opposing reflective surface 2312.

Reflective surfaces 2310 and 2312 may be designed such that light waves 2304 may reflect between surfaces 2310 and 2312 until the image represented by the light waves has been sufficiently modified (e.g., modified to appear that it is displayed from a suitable distance, for example 4 meters). Light waves 2304 may then escape collimator 2301 and reach the user's eye 2320.

Goggle system 100 may provide for audio in any suitable manner. In some embodiments, the user may receive audio from the electronic device from which media is provided to goggle system 100 (e.g., an iPod™ available by Apple Inc. of Cupertino, Calif., that is coupled to goggle system 100). Audio may then be received using headphones or speakers connected to the electronic device. In some embodiments, goggle system 100 may include an audio connector (e.g., a jack) or an integrated speaker or headset for providing audio directly from goggle system 100. In such embodiments, circuit board 161 or other components of goggle system 100 may be operative to extract audio streams from the media received by goggle system 100 (e.g., from an electronic device) and provide the audio stream to the audio connector, speakers or headset. In some embodiments, the speaker or headset may be integrated in a strap or other mechanism that holds goggle system 100 around a user's head (e.g., headphone speakers located in the strap at the user's ear level).

To improve the user's experience, goggle system 100 may include any suitable noise cancellation or noise reduction mechanism. For example, the goggle system may be provided with noise-proof earphones. As another example, the goggle system may identify outside and ambient noises (e.g., using a microphone embedded in the goggle system) and cancel the identified ambient noises when providing audio to the user.

In some embodiments, the components of the goggle system may be selected and manufactured to minimize weight. For example, the outer cover may be constructed to weigh no more than 33 grams, the mid-frame no more than 17 grams, the inner cover no more than 30 grams, the foam no more than 20 grams, the inner lens no more than 4 grams, the optical modules no more than 13 grams each, the dovetailed followers no more than 14 grams, the bottom frame no more than 19 grams, the mounting frame no more than 12 grams, and the display adjust mechanism no more than 18 grams. In some embodiments, the dovetailed followers, bottom frame, mounting frame, and display adjust mechanism may be manufactured in mass such that their combined weight is no more than 30 grams.

Figure 24:
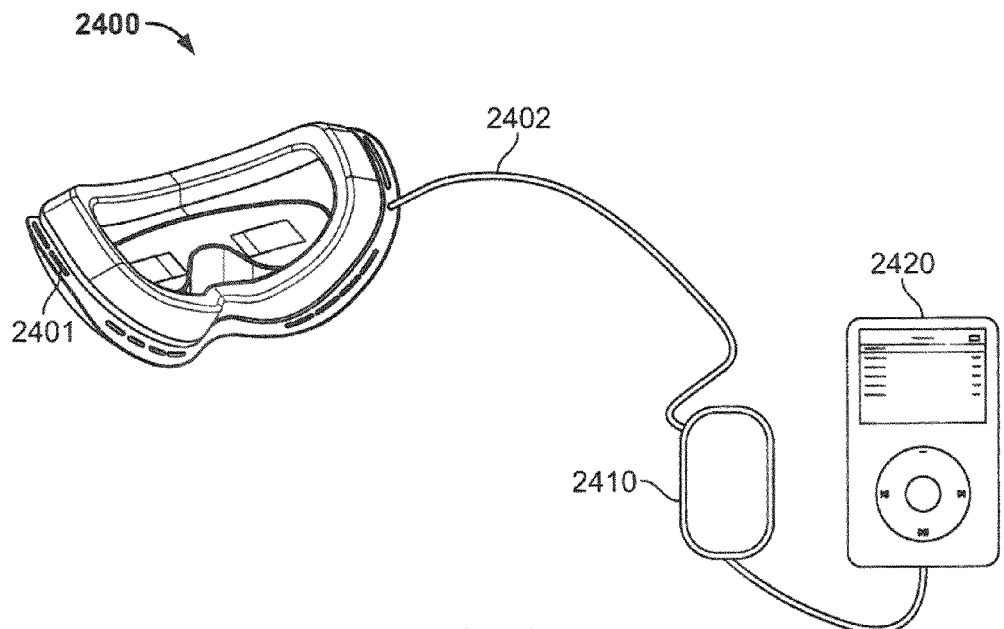
FIGS. 24-26 are schematic views of different approaches for providing media from an electronic device to the goggle system in accordance with one embodiment of the invention.
Figure 25:
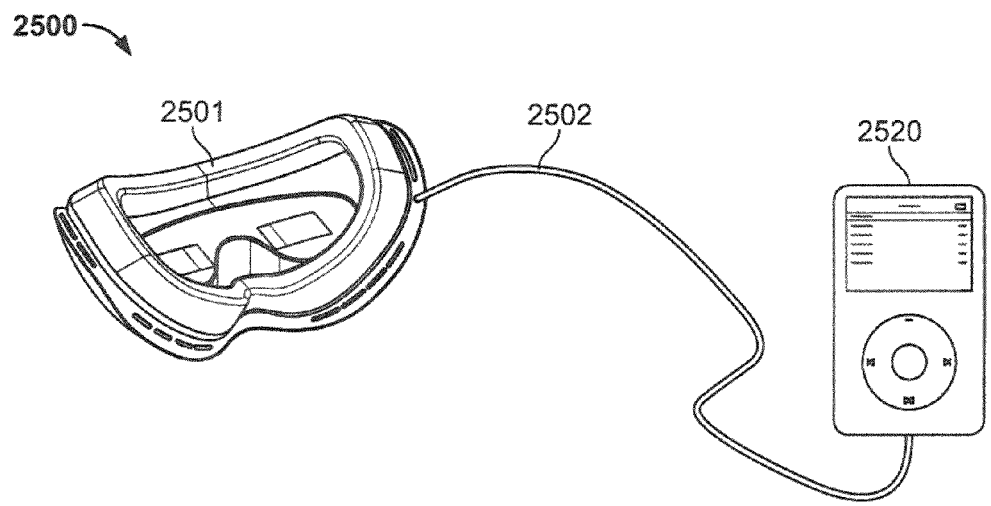
Figure 26:
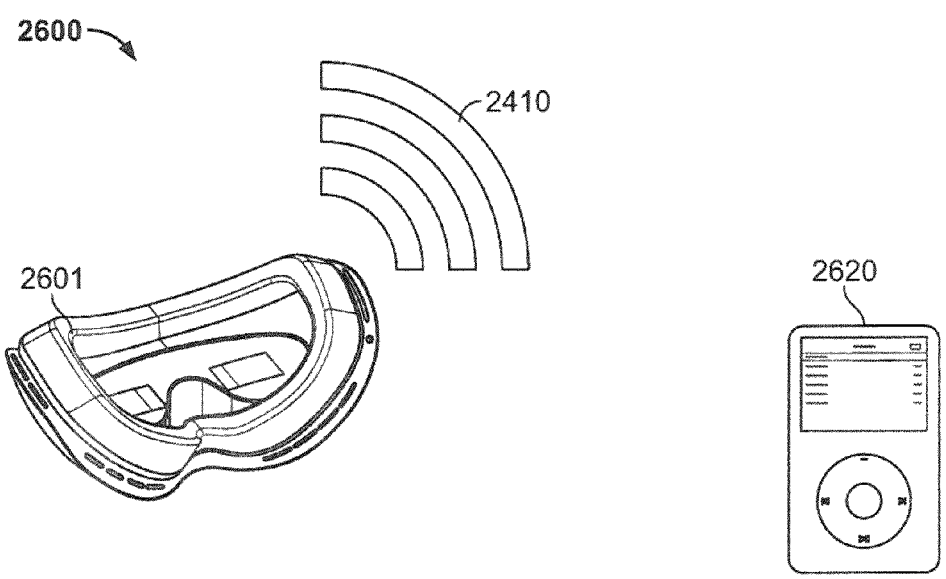

Goggle system 100 may be configured to receive media for display in the lens in any suitable manner. FIGS. 24-26 are schematic views of different approaches for providing media from an electronic device to the goggle system in accordance with one embodiment of the invention. Entertainment system 2400, displayed in FIG. 24, may include goggle system 2401, electronic device 2420, and cable 2402 coupling electronic device 2420 to goggle system 2401. Electronic device 2420 may be any suitable electronic device for providing media to goggle system 2401, such as, for example, a computer, a cellular telephone, a mobile communications device, a personal media device, a gaming device, a set-top box, a television system, or any other suitable electronic device.

Using cable 2402, media signals, control signals, power, or any other suitable type of signal may be transferred between electronic device 2420 and goggle system 2401. In some embodiments, goggle system 2401 may include a user interface allowing the user to control one or more features of electronic device 2401 through cable 2402.

Entertainment system 2400 may include connector box 2410. Connector box 2410 may include one or more connector portions for connecting to goggle system 2401 and electronic device 2420. In some embodiments, box 2410 may be permanently coupled to one of goggle system 2401 and electronic device 2420. Box 2410 may include a power connector, a video connector, and an audio connector, or any other suitable input/output interface. For example, box 2410 may include a connector for a 30-pin cable coupled to electronic device 2420 (e.g., a connector for media incoming from the electronic device).

In some embodiments, box 2410 may provide power to goggle system 2401. For example, box 2410 may power the circuit boards and optical modules of goggle system 2401. As another example, box 2410 may recharge a battery in goggle system 2401 that powers the components of goggle system 2401. In some embodiments, box 2410 may be configured to provide a conversion of video or audio signals from electronic device 2420 to goggle system 2401. For example, box 2410 may be configured to perform an analog to digital conversion for the media provided by electronic device 2420, or box 2410 may extract left and right images from received media.

In some embodiments, box 2410 may include memory, for example for storing or caching media to display in goggle system 2401. If box 2410 is coupled to goggle system 2401 only, box 2410 may store media available to goggle system 2401 in the absence of an electronic device. For example, box 2410 may incorporate some or all of the functionality of the electronic device (e.g., box 2410 used as an iPod). Box 2410 may include a user interface for allowing the user to control one or more features of goggle system 2401, electronic device 2420, or both. For example, the user interface may allow a user to control the media currently displayed in goggle system 2401 (e.g., fast forward, rewind, pause, next, or slow-motion), the volume of media, playlist controls, the luminosity of the display, or any other operation of the goggle system that may be electrically controlled (e.g., as opposed to mechanically controlled, such as the wheel of the display adjust mechanism in some embodiments of the invention). The user interface may include any suitable user interface such as, for example, a button, keypad, dial, click wheel, touch screen or pad, multi-touch screen or pad, or any other suitable interface.

In some embodiments, box 2410 may authenticate goggle system 2401 or electronic device 2420 before providing media from the electronic device to the goggle system. This approach may allow box 2410 to verify that a user has properly purchased or acquired access to the media that will be displayed.

Entertainment system 2500, displayed in FIG. 25, may include goggle system 2501 and electronic device 2520. Goggle system 2501 may be coupled to electronic device 2520 using cable 2502. In some embodiments, the some or all of the functionality and components of box 2410 (FIG. 24) may be incorporated in goggle system 2501, electronic device 2520, or both. For example, goggle system 2501 may include a user interface for controlling various features of goggle system 2501 and of electronic device 2520, memory, processing or control circuitry, or any other suitable components.

Entertainment system 2600, displayed in FIG. 26, may include goggle system 2601 and electronic device 2620. Electronic device 2620 may use a wireless communications protocol to provide data, such as media or playback instructions, to goggle system 2601. Suitable communications protocols may include, for example, Wi-Fi communications (e.g., one of the 802.11 standards), Bluetooth, Nordic, high frequency systems (e.g., 900 MHz, 2.4 GHz, and 5.6 GHz communication systems), short-range radio circuitry (e.g., walkie-talkie type circuitry), infrared, Global System for Mobile Communications (GSM), Synchronous Code Division Multiplexing (CDMA), General Packet Radio Service (GPRS), GSM Evolution (EDGE), combinations thereof, or any other suitable communications protocol.

Goggle system 2601 and electronic device 2620 may communicate any suitable data. For example, goggle system 2601 may transmit instructions for electronic device 2620 to perform one or more operations (e.g., provide media, create a playlist, shuffle songs, or navigate a menu). As another example, electronic device 2620 may transmit media streams (e.g., video streams or audio streams) to goggle system 2601 for display by the display generation components.

In some embodiments, some or all of the functionality and components of box 2410 (FIG. 24) may be incorporated in goggle system 2601, electronic device 2620, or both. For example, goggle system 2601 may include a user interface for controlling various features of goggle system 2601 and of electronic device 2520, memory, processing or control circuitry, or any other suitable components.

In some embodiments, the goggle systems may include some or all of the components, functionality, or both of the electronic device. For example, the goggle system may include a processor, data processing circuitry, or control circuitry, a user interface, memory for storing media (e.g., a hard-drive, a solid state drive, flash memory, permanent memory such as ROM, semi-permanent memory such as RAM, or cache), or any other suitable component. In some embodiments, the goggle system may include some or all of the software or firmware of the electronic device (e.g., a CODEC).

In some embodiments, the electronic device, the goggle system, or both may include one or more tuners for tuning television or radio signals. The tuners may allow the user to watch live television or listen to live radio with the goggle system. In some embodiments, the electronic device, the goggle system, or both may include circuitry or software for downloading media, streaming media (e.g., on demand media), purchasing access to content (e.g., pay-per-view programs), or for accessing any other type of media or content.

The user may control the playback of media, and other goggle system operations using any suitable approach. For example, the goggle system may include a user interface for controlling one or more of the operations of the goggle system and one or more of the operations of an electronic device coupled to the goggle system. Suitable operations may include, for example, controlling the display of media in the goggle system (e.g., the position of the display generation components, the luminosity of the display, audio volume, playback control, or 2-D/3-D toggle), controlling the remote device (e.g., on/off, playback control, playlist generation and management, library management, etc.), or any other suitable operation. The user interface may be any suitable user interface including, for example, a button, keypad, dial, click wheel, touch screen or pad, multi-touch screen or pad, combinations thereof, or any other suitable user interface.

Figure 27:
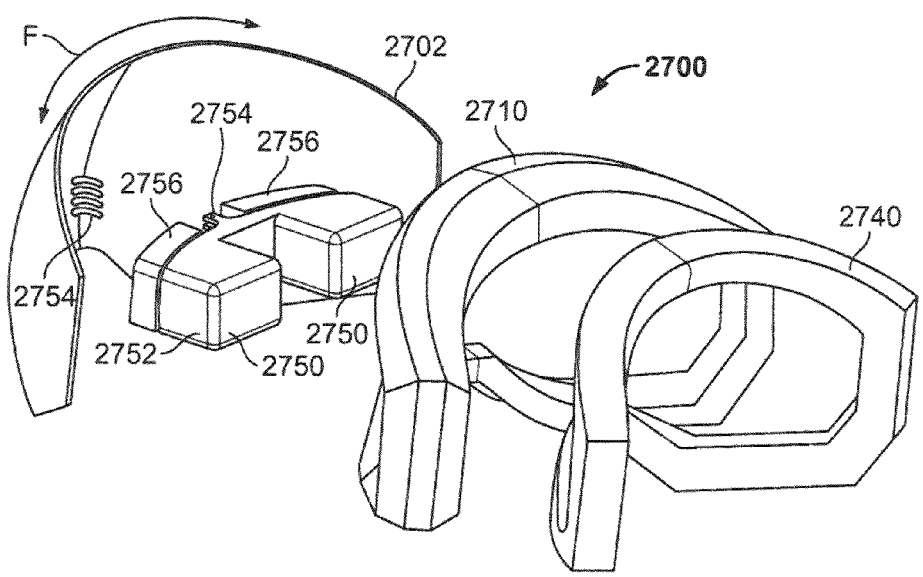
FIG. 27 is an exploded view of a goggle system in accordance with another embodiment of the invention.

In some embodiments, the goggle system may include different components, or combinations of components from goggle system 100. FIG. 27 is an exploded view of a goggle system in accordance with another embodiment of the invention. Goggle system 2700 may include outer lens or cover 2702, spacer or mid-frame 2710, foam layer 2740, and optical modules 2750. It is to be noted that goggle system 2700 may not include an inner cover coupled to the optical modules (e.g., inner cover 120, FIG. 1), for example to further reduce the rigidity and enhance the flexibility of goggle system 2700.

Outer cover 2702 may include some or all of the features of outer cover 104 (FIG. 1). In particular, outer cover 2702 may be manufactured from any suitable material including, for example, glass, plastic, ceramic, metal (e.g., polished aluminum), or any other suitable material. Spacer or mid-frame 2710 may include some or all of the features of mid-frame 110, inner cover 120 (FIG. 1), or both. Spacer 2710 may be coupled to outer cover 2702 around optical modules 2750. Spacer 2710 may be manufactured from any flexible material operative to bend or deflect with outer cover 2702 but also stiff enough as not to compress (e.g., and damage optical modules 2750). Spacer 2710 may conform to the shape of a user's face but still provide the desired spacing between the user's eyes and modules 2750.

Foam layer 2740 may include some or all of the features of foam 140 (FIG. 1). For example, foam layer 2740 may include any compressible foam or material operative to compress to accommodate uneven matches between the curvature of spacer 2710 and the shape of a user's face to maximize the user's comfort when wearing goggle system 2700.

Optical modules 2750 may include a frame, a display adjust mechanism, dovetailed followers, and display generation modules, all of which may include some or all of the features of the corresponding components described above in connection with goggle system 100 (FIG. 1). Optical modules 2750 may be protected in a rigid shell 2752 and compliantly coupled to outer cover 2702 via a rotatable hinge coupling system 2754 that may allow shell 2752 with modules 2750 to swivel with respect to outer cover 2702 (e.g., adjusting the user's display). In some embodiments, optical modules 2750 may instead or in addition be coupled to spacer 2710.

In some embodiments, flexible padding 2756 may be provided between modules 2750 and outer cover 2702 to protect modules 2750 when they rotate relative hinge coupling system 2754 and impact outer cover 2702. Padding 2756 may include any suitable type of foam or spring system or any other suitable flexible material or system that may allow for deflection of padding 2756 as shell 2752 rotates in the direction of arrows F about the center line of the outer cover. In some embodiments, outer cover 2702 may instead or in addition be operative to deflect to allow shell 2752 to move.

Figure 28A:
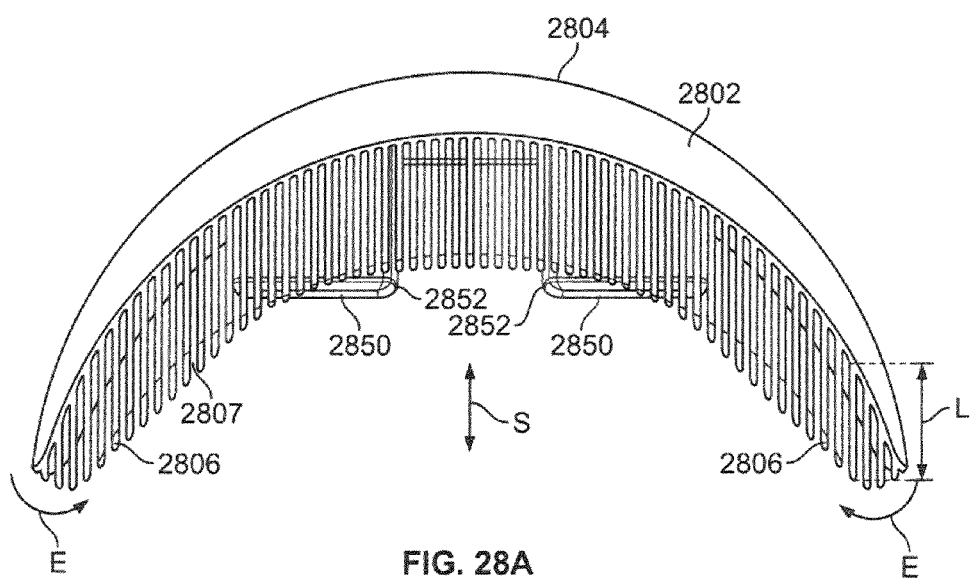
FIG. 28A is a top view and FIG. 28B is a perspective view of another goggle system in accordance with one embodiment of the invention.
Figure 28B:
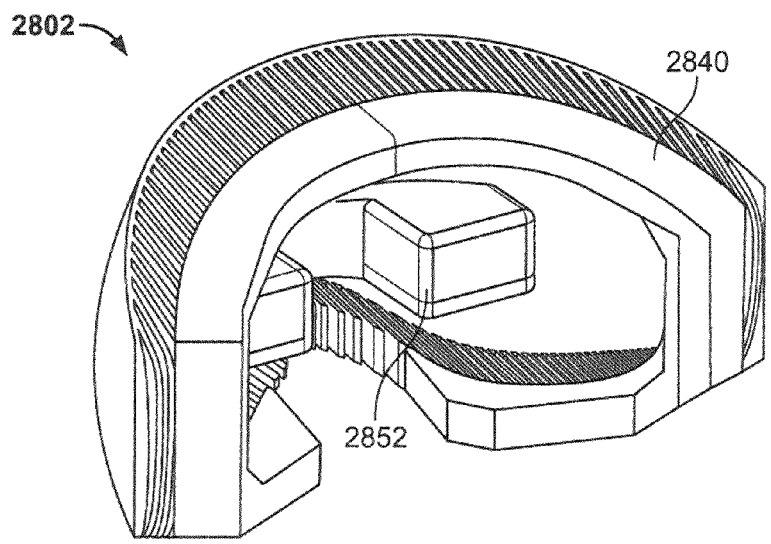

FIG. 28A is a top view, and FIG. 28B is a perspective view of another goggle system in accordance with one embodiment of the invention. Goggle system 2800 may include outer cover 2802, foam layer 2840 and optical modules 2850. Outer cover 2802 may include outer surface 2804 and several fins 2806 extending away from outer surface 2804 about shell 2852 of optical modules 2850. Fins 2806 may be manufactured by creating several spaced apertures or slots 2807 in a portion of outer cover 2802 (e.g., along the top surface, bottom surface, or both of outer cover 2802). Any suitable material may be selected for fins 2806. For example, the material used for fins 2806 may be selected so that fins 2806 are stiff in the direction of arrows S (i.e., along their long axis) to maintain the desired spacing between optical modules 2850 and a user's eyes, but also such that fins 2806 may deflect towards one another in the direction of arrows E when outer cover 2802 is deflected. The length L of each fin 2806 may be selected such that a user's eyes may be separated from modules 2850 by the desired distance once foam layer 2840 is coupled to the ends of fins 2806 of outer cover 2802 (e.g., as shown in FIG. 28B).

Figure 29:
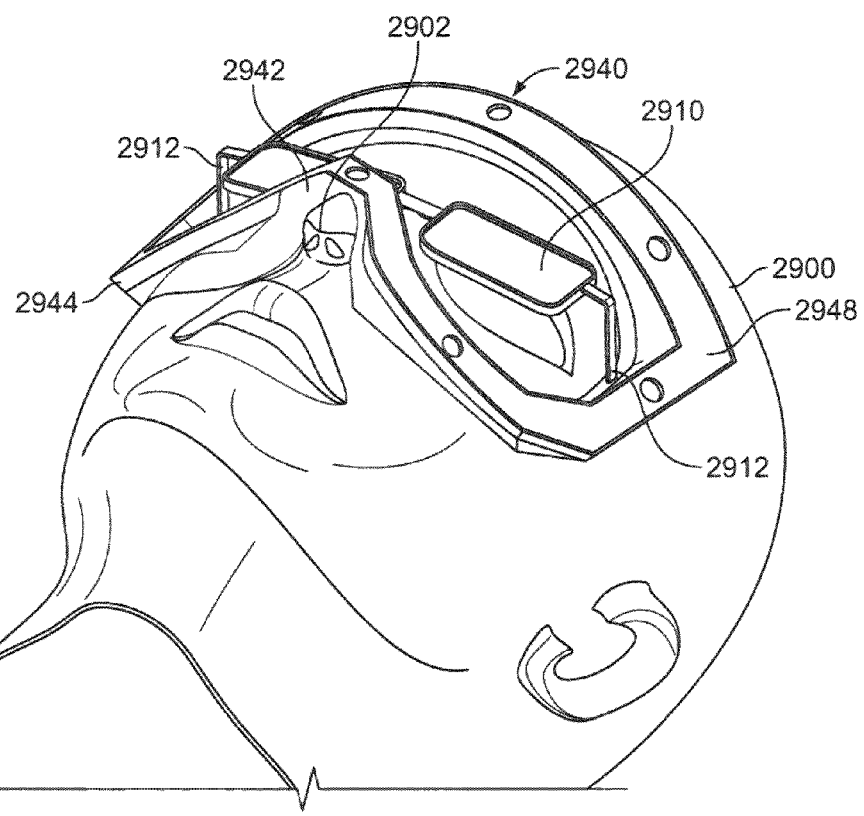
FIG. 29 is a perspective view of a foam layer placed on a user's face in accordance with one embodiment of the invention.
Figure 30:
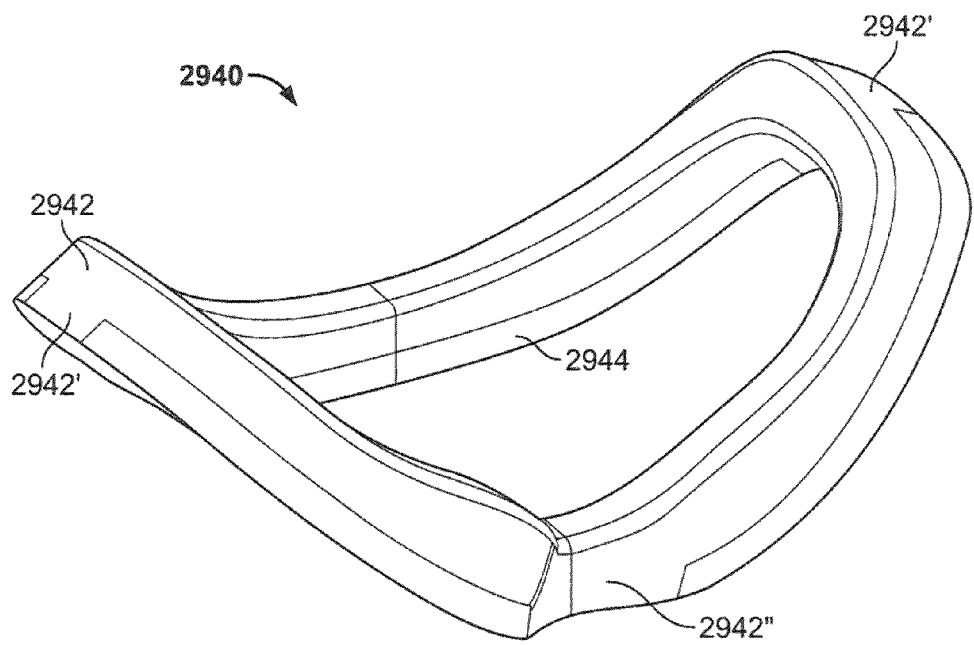
FIG. 30 is a perspective view of the back side of the foam layer of FIG. 29 in accordance with one embodiment of the invention.

The goggle system may use any suitable foam for ensuring the user a comfortable fit. For example, the goggle system may include different types of foam layers. FIG. 29 is a perspective view of a foam layer placed on a user's face in accordance with one embodiment of the invention. FIG. 30 is a perspective view of the back side of the foam layer of FIG. 29 in accordance with one embodiment of the invention. Foam layer 2940, which may include some or all of the features of foam layer 140 (FIG. 1), may include a soft foam portion 2942 through the full part thickness of foam layer 2940 in at least certain specific locations. This may improve the comfort of a user using goggles with foam layer 2940, especially for users who wear eyeglasses (e.g., user 2900 who is wearing eyeglasses 2910 with temples 2912 supported by nose 2902). As shown in FIG. 30, soft foam portion 2942 may be provided through the full part thickness of foam layer 2940 at locations 2942', which may correspond to temples 2912 of eyeglasses 2910, and at location 2942", which may correspond to the user's nose 2902. The portions of soft foam portion 2942 that run through the full part thickness of foam layer 2940 may improve the comfort of user 2900 by at least reducing the pressure created by foam layer 2940 on temples 2912 and nose 2902, for example.

Figure 31:
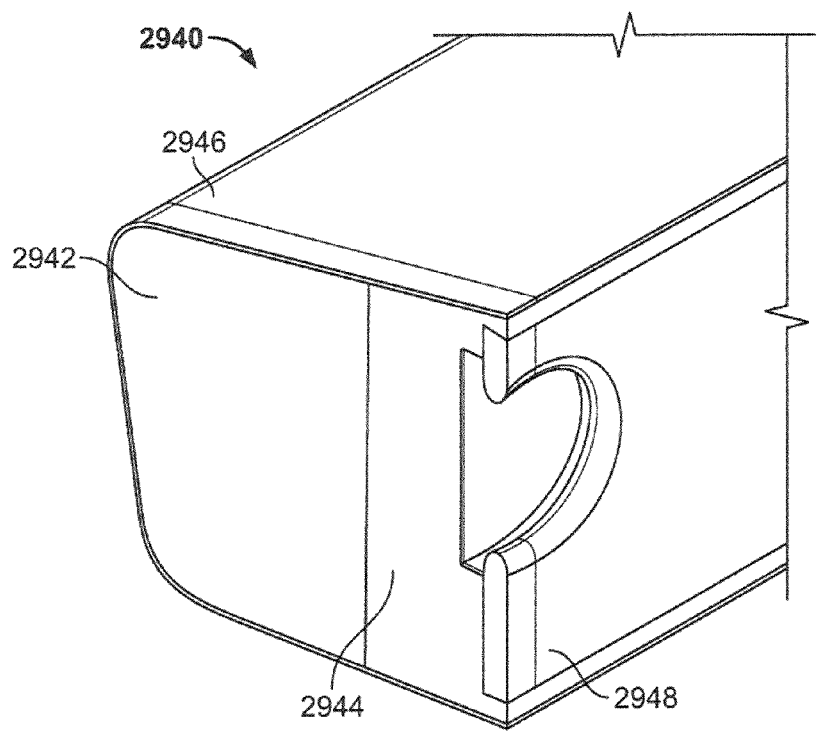
FIG. 31 is a cross-sectional view of the foam layer of FIG. 29 in accordance with one embodiment of the invention.

FIG. 31 is a cross-sectional view of the foam layer of FIG. 29 in accordance with one embodiment of the invention. Foam layer 2940 may include soft foam portion 2942 and a hard foam portion 2944 that may be of a harder density than soft foam portion 2942. Foam layer 2940 may also include a flocked material 2946 forming the cosmetic external surface of foam portions 2942 and 2944 to increase the comfort of the user and enhance the aesthetic appearance of the goggle system. In some embodiments, foam layer 2940 may include mounting plate 2948 provided on the surface of foam layer 2940 facing away from the user for coupling foam layer 2940 to another portion of the goggle system (e.g., an outer cover). Mounting plate 2948 may be formed from any suitable material, including for example metal, a composite material, plastic (e.g., polyurethane), or any other suitable material.

Figure 32:
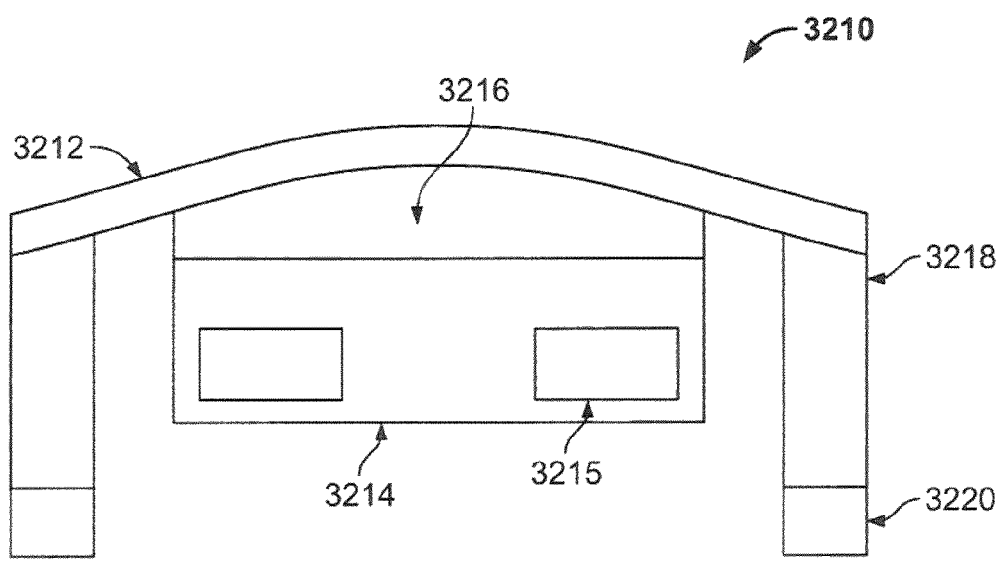
FIG. 32 is a top view of a schematic head-mounted display in accordance with one embodiment of the invention.

FIG. 32 is a top view of a schematic head-mounted display in accordance with one embodiment of the invention. Head mounted display 3210 may include outer shield 3212, which may be formed in a wide variety of shapes. For example, outer shield 3212 may include rectilinear shapes, curvilinear shapes, a sheet (e.g., a curved surface), a box-like shape (e.g., with one or more side walls), or any other suitable shape. Outer shield 3212 may be formed from any suitable material including, for example, a plastic, metal, rubber, ceramic material, combinations of these, or any other suitable material. In some embodiments, a flexible material may be selected for outer shield 3212 to ensure the head mounted display remains somewhat compliant, thereby improving the feel of the head mounted display when worn on the face (e.g., conforming better to the face).

Head mounted display 3210 may include optical module 3214, which may include a frame operative to support and protect display elements 3215. Because optical module 3214 includes display elements 3215 (which may be fragile), the frame may include one or more rigid or durable components. In some embodiments, the frame may include a cross bar and one or more integrally formed enclosures for housing display elements 3215.

Head mounted display 3210 may include connector assembly 3216 operative to couple optical module 3214 to outer shield 3212 using any suitable approach. Connector assembly 3216 may rigidly secure optical module 3214 to outer shield 3212 (e.g., does not allow optical module 3214 to move), or connector assembly 3216 may allow optical module 3214 to move relative to outer shield 3212. For example, connector assembly 3216 may allow the optical module 3214 to slide relative to the inner surface of outer shield 3212 along one or more axes, or to pivot about one or more axes. In some embodiments, optical module 3214 may be coupled to connector assembly 3216 using a flexure system, a gimbal type arrangement, a linkage system, a combination of these, or any other suitable system. Connector assembly 3216 may provide any number of degrees of freedom depending on the needs of head mounted display 3210.

Connector assembly 3216 may include a stabilization system for stabilizing optical module 3214 relative to outer shield 3212. For example, a spring (e.g., a sprung system) may be used such that the spring force between optical module 3214 and outer shield 3212 may equalize the forces to maintain the optical elements of optical module 3214 parallel to the user's face when outer shield 3212 bends around the user's face. The spring force may be embodied in a variety of ways, including for example conventional springs such as compression, tension, torsion, and leaf springs may be used, compressive materials (e.g., foam), or any other suitable manner.

Head mounted display 3210 may include face frame 3218, which may be constructed to both bend easily, but be very stiff in compression. This can be implemented in a wide variety of ways, including for example using a fanned structure with air voids, voids filled with selected materials (e.g., foam), combinations of these, or any other suitable material. The fanned structure may be formed from a variety of materials depending on the desired rigidity and flexibility. Such materials may include, for example, plastics, rubbers, and various foam materials.

Face frame 3218 may be fixed or mounted to inner portion of the outer shield 3212. For example, face frame 3218 may be coupled along the peripheral edge portion of outer shield 3212. In some embodiments, face frame 3218 may include a mounting system for attaching itself to outer shield 3212. For example, face frame 3218 may include slots that receive flanges on the inner surface of outer shield 3212 (or vice versa). In this manner, face frame 3218 may be very easily snapped into place. This may allow for different sized face frames 3218 to be used (e.g., people have different faces and therefore different sizes of face frames may be needed). Any suitable mounting arrangement may be used including, for example, friction couplings, screws, adhesives (e.g., glue or epoxy), hook and fastener material (e.g., Velcro), or any other suitable mounting arrangement.

Head mounted display 3210 may include face contacting member 3220 operative to comfortably conform to a user's face when head mounted display 3210 is worn. Face contacting member 3220 may compress as necessary to conform to the user's face using uniform compressibility or varying compressibility about the perimeter (discrete points or portions may be more or less compressible than other points or portions). Face contacting member 3220 may be affixed or mounted to face frame 3218, for example in a manner similar to how face frame 3218 is attached to the outer shield 3212. In some embodiments, face frame 3218 and face contacting member 3220 may be coupled together as an integrated unit. Various materials may be used for the face contacting member 3220, including for example foam-like materials (e.g., as a single piece of foam or a combination of several pieces of foam) or other compressible materials. By changing the material or materials used for different portions of face contacting member 3220, the compressive forces at discrete points about the perimeter may vary thereby making head mounted display 3210 more comfortable to wear. In some embodiments, face contacting member 3220 may include an outer layer selected for its aesthetic appearance. For example, one or more sides of face contacting member 3220 (e.g., the side surfaces and face contacting surfaces) may be covered with a coating or flocking material such as fabric or rubber like materials.

It will be understood that this invention may be implemented in any suitable device for supporting the display generation components. For example, the principles of this invention may also be applied to glasses (e.g., sunglasses), a helmet, a hat, or any other suitable device for supporting the display generation components on a user.

The above described embodiments of the present invention are presented for purposes of illustration and not of limitation, and the present invention is limited only by the claims which follow.

What is claimed is:

1. A head-mounted display, comprising:
    a spacer operative to receive at least one component of the head-mounted display;
    an outer cover coupled to the spacer, the outer cover forming at least a portion of an outer surface of the head-mounted display;
    at least one optical module movably coupled to the spacer, substantially enclosed by the outer cover, and operative to be displaced along at least two axes and in rotation around at least one axis with respect to the spacer without moving the outer cover with respect to the spacer.

2. The head-mounted display of claim 1, wherein the spacer comprises a plurality of flexible fins extending away from the outer cover towards a user's head.

3. The head-mounted display of claim 2, wherein the flexible fins are operative to bend to allow the spacer to conform to the shape of the user's head.

4. The head-mounted display of claim 1, further comprising:
    a frame coupled to the spacer, wherein the at least one optical module is enclosed within the frame.

5. The head-mounted display of claim 4, further comprising a stabilization system for coupling the frame to the spacer.

6. The head-mounted display of claim 1, wherein the outer cover comprises at least one of glass, plastic, ceramic, and metal.

7. The head-mounted display of claim 1, wherein the spacer comprises at least one groove for receiving the outer cover.

8. The head-mounted display of claim 1, wherein the spacer comprises at least perforation for at least one of allowing humidity to escape from within the head-mounted display and maintaining a constant temperature inside and outside the head-mounted display.

9. The head-mounted display of claim 1, wherein the at least one component comprises at least one of at least one strap, an inner cover, and an attachment feature.

* * * * *